United States Patent
Iwasaki et al.

(10) Patent No.: US 10,686,959 B2
(45) Date of Patent: Jun. 16, 2020

(54) IMAGE FORMING APPARATUS AND IMAGE FORMING METHOD

(71) Applicants: Mitsutaka Iwasaki, Kanagawa (JP); Hidetoshi Suzuki, Kanagawa (JP)

(72) Inventors: Mitsutaka Iwasaki, Kanagawa (JP); Hidetoshi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/021,451

(22) Filed: Jun. 28, 2018

(65) Prior Publication Data
US 2019/0020780 A1 Jan. 17, 2019

(30) Foreign Application Priority Data
Jul. 12, 2017 (JP) .................................. 2017-136421

(51) Int. Cl.
*H04N 1/047* (2006.01)
*H04N 1/06* (2006.01)
*G06K 15/02* (2006.01)
*G06F 3/12* (2006.01)

(52) U.S. Cl.
CPC ......... *H04N 1/0473* (2013.01); *H04N 1/0614* (2013.01)

(58) Field of Classification Search
None
See application file for complete search history.

(56) References Cited

U.S. PATENT DOCUMENTS

| 4,872,037 A * | 10/1989 | Kasahara | G03G 15/0131 399/301 |
| 5,262,937 A * | 11/1993 | Mackin | G06K 15/028 347/232 |
| 6,771,919 B2 * | 8/2004 | Koide | G03G 15/757 347/116 |
| 2003/0152280 A1 | 8/2003 | Kadowaki et al. | |
| 2004/0247185 A1 | 12/2004 | Sato et al. | |
| 2012/0201552 A1 * | 8/2012 | Hirai | G03G 15/5058 399/49 |
| 2014/0301748 A1 * | 10/2014 | Suzuki | G03G 15/5025 399/49 |
| 2016/0187807 A1 | 6/2016 | Hirai et al. | |
| 2016/0223934 A1 | 8/2016 | Watanabe et al. | |
| 2017/0011282 A1 | 1/2017 | Iwasaki | |
| 2017/0013143 A1 | 1/2017 | Arita et al. | |

(Continued)

FOREIGN PATENT DOCUMENTS

| JP | 2007-140402 | 6/2007 | |
| JP | 2008076576 | * 4/2008 | ............. G03G 15/08 |

(Continued)

*Primary Examiner* — Beniyam Menberu
(74) *Attorney, Agent, or Firm* — Oblon, McClelland, Maier & Neustadt, L.L.P.

(57) ABSTRACT

An image forming apparatus includes a rotating body to form an image, a sensor to detect a home position of the rotating body, a processor to acquire image density data of the image formed by the rotating body in odd-numbered rotation and even-numbered rotation of the rotating body separately based on a rotation home position signal output by the sensor, extract an image density fluctuation caused by a rotation of the rotating body, and correct an image forming condition based on the image density fluctuation.

7 Claims, 30 Drawing Sheets

(56) References Cited

U.S. PATENT DOCUMENTS

| | | | |
|---|---|---|---|
| 2017/0102658 A1* | 4/2017 | Ikeda | G03G 15/5025 |
| 2017/0187916 A1 | 6/2017 | Ohta et al. | |
| 2017/0187917 A1 | 6/2017 | Tanaka et al. | |
| 2017/0195518 A1 | 7/2017 | Watanabe et al. | |
| 2017/0308018 A1* | 10/2017 | Uchida | G03G 15/5058 |

FOREIGN PATENT DOCUMENTS

| | | |
|---|---|---|
| JP | 2015-090475 | 5/2015 |
| JP | 2016-122180 | 7/2016 |
| JP | 2016-141111 | 8/2016 |

* cited by examiner

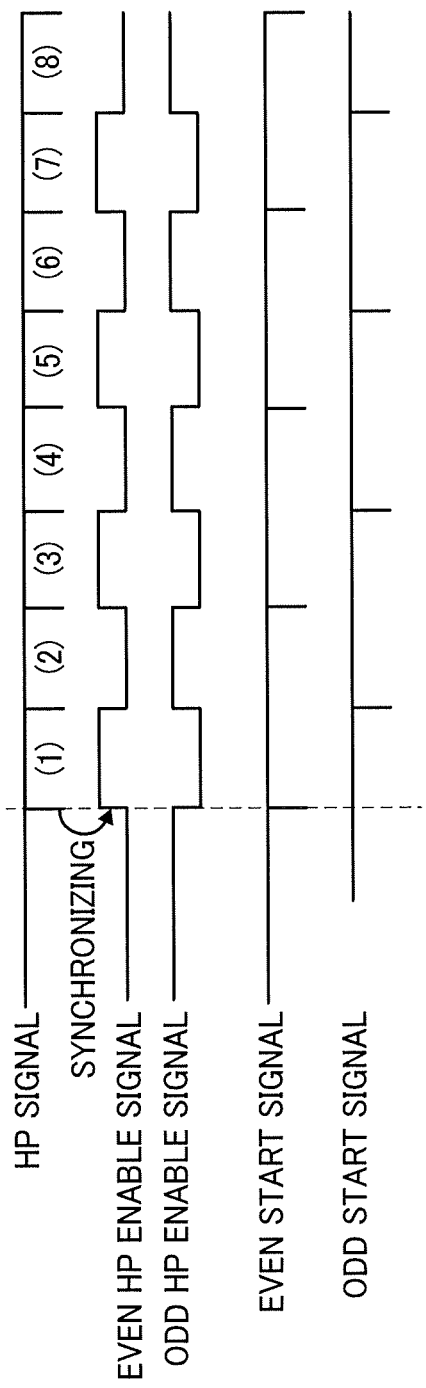

IMAGE FORMING APPARATUS AND IMAGE FORMING METHOD

CROSS-REFERENCE TO RELATED APPLICATION

This patent application is based on and claims priority pursuant to 35 U.S.C. § 119 to Japanese Patent Application No. 2017-136421, filed on Jul. 12, 2017 in the Japanese Patent Office, the entire disclosure of which is hereby incorporated by reference herein.

BACKGROUND

Technical Field

Embodiments of the present disclosure generally relate to an image forming apparatus and an image forming method.

Description of the Related Art

A known image forming apparatus has a plurality of sub modules such as a photoconductor drum, a charging device, an exposure device, a developing device, a transfer device. In the image forming apparatus, the charging device uniformly charges the rotating photoconductor drum. Then, the exposure device exposes the surface of the charged photoconductor drum to form an electrostatic latent image on the photoconductor drum. The developing device develops the electrostatic latent image formed on the photoconductor drum into a visible toner image, and the transfer device transfers the obtained toner image onto a recording medium.

To decrease image density fluctuation of the image, the image forming apparatus forms a predetermined toner image pattern at a predetermined timing, detects an image density of the formed toner image pattern, and adjusts operating parameters of the submodules of the image forming apparatus based on the detected image density. Examples of the operating parameters include a charging bias in the charging device, a luminous energy of a light beam irradiated from the exposure device, a developing bias in the developing device, a toner supply amount, and an output of the transfer device.

In the image forming apparatus, tolerances of the photoconductive layer formed on the photoconductor drum or the photoconductor drum itself are such that, even when the above-described operating parameters are set properly, an image density fluctuation sometimes occurs in a rotation direction of the photoconductor drum, that is, in a sub-scanning direction. In addition to the photoconductor drum, a predetermined dimensional error is also allowed for a charging roll provided in the charging device, a developing sleeve provided in the developing device, a transfer roll provided in the transfer device, and the like, respectively. Therefore, these submodules may also cause the image density fluctuation in the sub-scanning direction when an image is formed.

SUMMARY

This specification describes an improved image forming apparatus that includes a rotating body to form an image, a sensor to detect a home position of the rotating body, and a processor. The processor acquires image density data of the image formed by the rotating body in odd-numbered rotation and even-numbered rotation of the rotating body separately based on a rotation home position signal output by the sensor, extracts an image density fluctuation caused by a rotation of the rotating body, and corrects an image forming condition based on the image density fluctuation.

This specification further describes an improved image forming method that includes detecting a home position of a rotating body to form an image, acquiring image density data of the image formed by the rotating body in even-numbered rotation and odd-numbered rotation separately while counting a number of rotations of the rotating body based on the home position detected, calculating an image density fluctuation of the image formed by the rotating body based on the image density data, and correcting an image forming condition based on the image density fluctuation.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 27 is a timing chart to generate an HP enable signal and a start signal (pulse) for identifying an even-numbered rotation and an odd-numbered rotation from the HP signals of the photoconductor in the first embodiment of the present disclosure;

Figure 1:
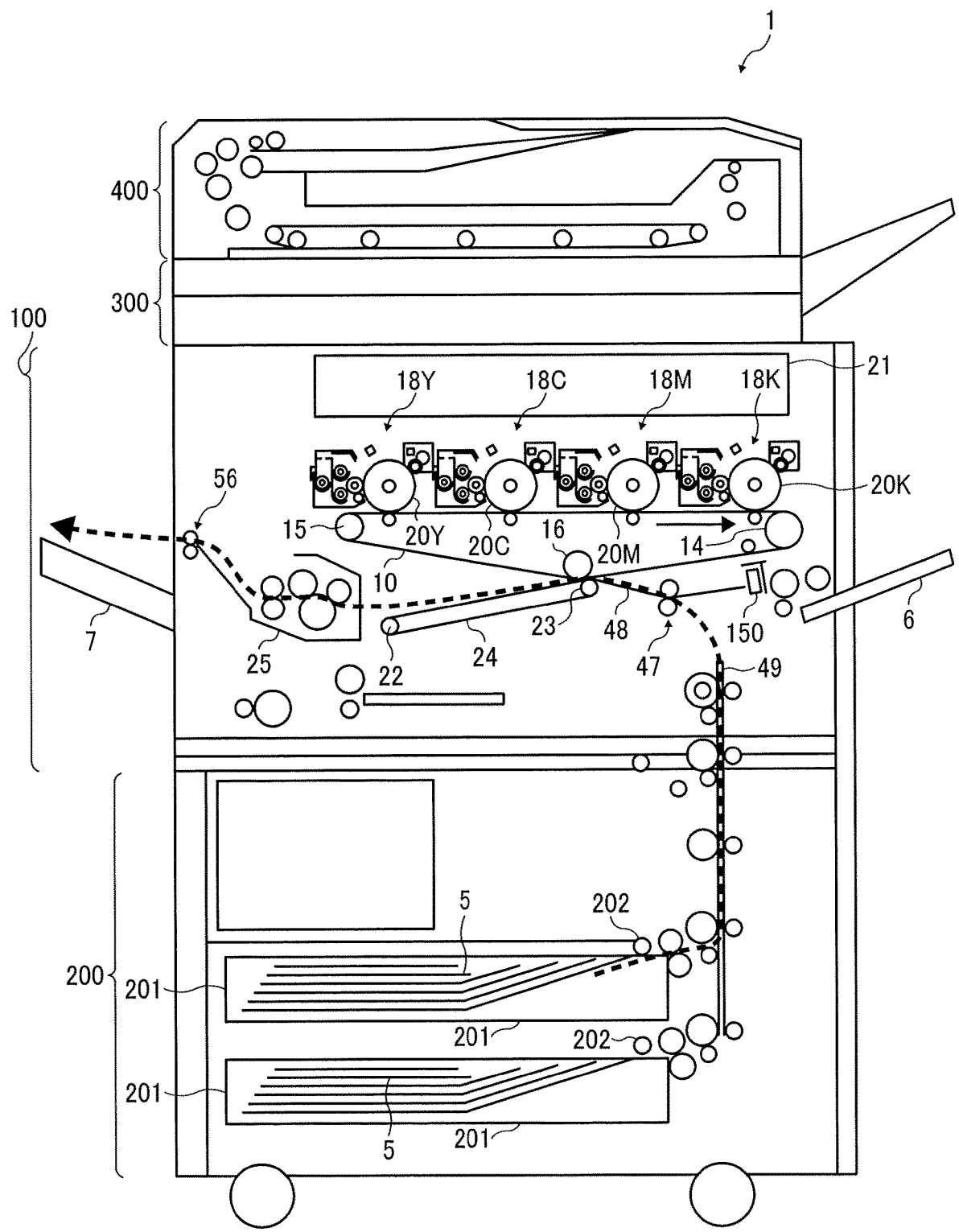
FIG. 1 is a schematic view of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings illustrating the following embodiments, the same reference codes are allocated to elements (members or components) having the same function or shape and redundant descriptions thereof are omitted below.

FIG. 1 is a schematic view of an image forming apparatus according to a first embodiment of the present disclosure. Descriptions are given below of a basic structure of an image forming apparatus, such as a full color copier using an electrophotography (hereinafter, referred to as a "copier"), to which one or more of aspects of the present disclosure is applied.

A basic structure of the image forming apparatus 1 according to the present embodiment is firstly described. As illustrated in FIG. 1, the image forming apparatus 1 includes an image forming section 100 to form an image on a recording sheet 5, a sheet feeder 200 to supply the recording sheet 5 to the image forming section 100, and a scanner 300 to read an image on a document. In addition, an automatic document feeder (ADF) 400 is disposed above the scanner 300. The image forming section 100 includes a bypass feeder 6 to feed a recording sheet different from the recording sheets 5 contained in the sheet feeder 200, and a stack tray 7 to stack the recording sheet 5 after an image has been formed thereon.

In FIG. 1, a laser writing device 21 is disposed above image forming units 18Y, 18C, 18M, and 18K. The laser writing device 21 emits writing light based on image data of a document read by the scanner 300 or image data sent from an external device such as a personal computer. Specifically, based on the image data, a laser controller drives a semiconductor laser to emit the writing light. The writing light exposes and scans each of the drum-shaped photoconductors 20Y, 20C, 20M, and 20K, serving as latent image bearers, of the image forming units 18Y, 18C, 18M, and 18K, thereby forming an electrostatic latent image thereon. The light source of the writing light is not limited to a laser diode but can be a light-emitting diode (LED), for example.

With reference to FIG. 1, the image forming section 100 includes a conveyance path 48, through which the recording sheet 5 fed from the sheet feeder 200 or the bypass feeder 6 is sequentially transported to the secondary transfer nip, a fixing device 25 described later, and an ejection roller pair 56. The image forming section 100 includes another conveyance path 49 to convey the recording sheet 5 fed to the image forming section 100 from the sheet feeder 200 to an entrance of the conveyance path 48. A registration roller pair 47 is disposed at the entrance of the conveyance path 48.

When a print job is started, the recording sheet 5, fed from the sheet feeder 200 or the bypass feeder 6, is conveyed to the conveyance path 48. The recording sheet 5 then abuts against the registration roller pair 47. The registration roller pair 47 starts rotation at a proper timing, thereby sending the recording sheet 5 toward the secondary transfer nip. In the secondary transfer nip, the four-color superimposed toner image on the intermediate transfer belt 10 tightly contacts the recording sheet 5. The four-color superimposed toner image is secondarily transferred onto the surface of the recording sheet 5 due to effects of the secondary transfer electrical field and nip pressure. Thus, a full-color toner image is formed on the recording sheet 5.

The conveyor belt 24 conveys the recording sheet 5 that has passed through the secondary transfer nip to the fixing device 25. The recording sheet 5 is pressed and heated inside the fixing device 25, thereby the full-color toner image is fixed on the surface of the recording sheet 5. After discharged from the fixing device 25, the recording sheet 5 is conveyed to the ejection roller pair 56 and ejected onto the stack tray 7.

Figure 2:
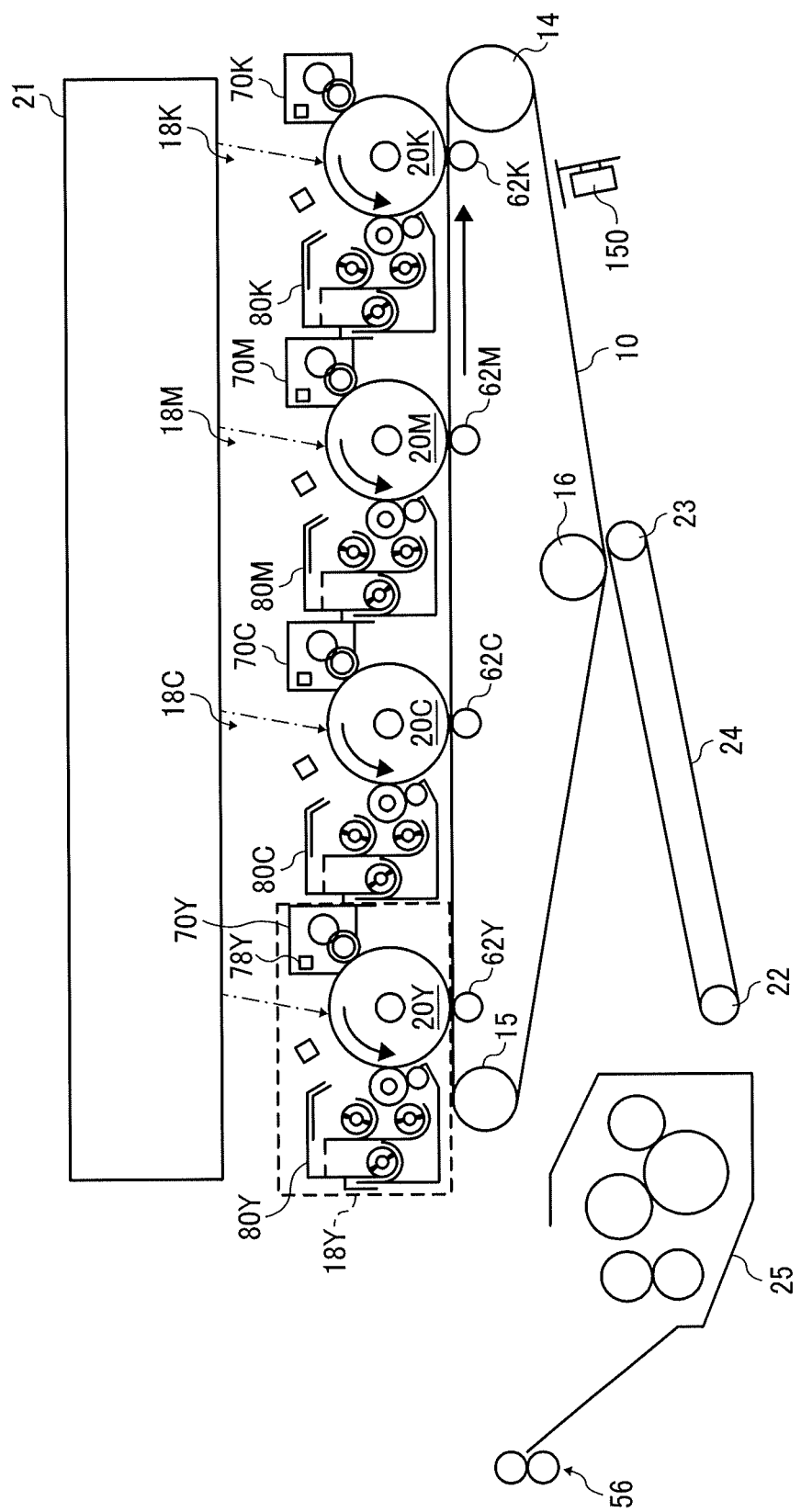
FIG. 2 is an enlarged view of an image forming section of the image forming apparatus 1.

FIG. 2 is an enlarged view of an image forming section 100 of the image forming apparatus 1. The image forming section 100 includes a transfer unit including an intermediate transfer belt 10 that is an endless belt serving as a transfer member. The intermediate transfer belt 10 of the transfer unit is stretched around three support rollers 14, 15, and 16 and moves endlessly clockwise in FIGS. 1 and 2, as one of the three support rollers rotates. Four image forming units corresponding to yellow (Y), cyan (C), magenta (M), and black (K) are disposed opposite the outer side of a portion of the intermediate transfer belt 10 moving between the first support roller 14 and the second support roller 15. An optical sensor unit 150 to detect an image density (that is, toner adhesion amount per unit area) of a toner image formed on the intermediate transfer belt 10 is disposed opposite the outer side of the portion of the intermediate transfer belt 10 moving between the second support roller 15 and the third support roller 16. The optical sensor unit 150 serves as an image density detector.

With reference to FIG. 2, the four image forming units 18Y, 18C, 18M, and 18K are similar in structure, except the color of toner used therein. For example, the image forming unit 18Y to form yellow toner images includes the photoconductor 20Y, a charging device 70Y, and a developing device 80Y. The charging device 70Y charges the surface of the photoconductor 20Y uniformly to a negative polarity. Of the uniformly charged surface of the photoconductor 20Y, the portion irradiated with the laser light from the laser writing device 21 has an attenuated potential and becomes an electrostatic latent image.

In FIG. 2, primary transfer rollers 62Y, 62C, 62M, and 62K are disposed inside the loop of the intermediate transfer belt 10 and nip the intermediate transfer belt 10 together with the photoconductors 20Y, 20C, 20M, and 20K. Accordingly, the outer face of the intermediate transfer belt 10 contacts the photoconductors 20Y, 20M, 20C, and 20K, and the contact portions therebetween serve as primary transfer nips for yellow, magenta, cyan, and black, respectively. Primary electrical fields are respectively generated between the primary transfer rollers 62Y, 62C, 62M, and 62K and the photoconductors 20Y, 20C, 20M, and 20K, to each of which the primary transfer bias is applied.

The outer face of the intermediate transfer belt 10 sequentially passes the primary transfer nips for yellow, cyan, magenta, and black as the intermediate transfer belt 10 rotates. During such a process, yellow, magenta, cyan, and black toner images are sequentially transferred from the photoconductors 20Y, 20C, 20M, and 20K and superimposed on the outer face of the intermediate transfer belt 10 (i.e., primary transfer process). Thus, a four-color superimposed toner image is formed on the outer face of the intermediate transfer belt 10.

Below the intermediate transfer belt 10, an endless conveyor belt 24 is stretched around a first tension roller 22 and a second tension roller 23. The conveyor belt 24 rotates counterclockwise in the drawing as one of the tension rollers 22 and 23 rotates. The outer face of the conveyor belt 24 contacts a portion of the intermediate transfer belt 10 winding around the third support roller 16, and the contact portion therebetween is called "secondary transfer nip." Around the secondary transfer nip, a secondary transfer electrical field is generated between the second tension roller 23, which is grounded, and the support roller 16, to which a secondary transfer bias is applied.

Figure 3:
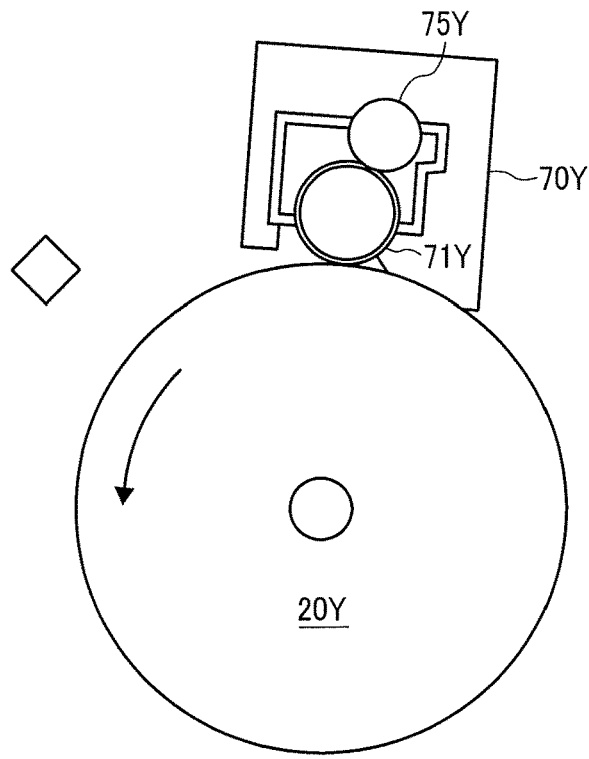
FIG. 3 is an enlarged view of a photoconductor and a charging device for yellow.

FIG. 3 is an enlarged view of the photoconductor 20Y and the charging device 70Y for yellow. Components for forming yellow images are described as representatives. The charging device 70Y includes a charging roller 71Y that contacts the photoconductor 20Y to rotate following a rotation of the photoconductor 20Y, a charging roller cleaner 75Y that contacts the charging roller 71Y to rotate following a rotation of the charging roller 71Y, and a rotary attitude sensor which is described later.

In FIG. 3, the charging roller cleaner 75Y of the charging device 70Y includes a conductive cored bar and an elastic layer covering the cored bar. The elastic layer, which is a sponge body produced by foaming or expanding melamine resin to have micro pores, rotates while contacting the charging roller 71Y. While rotating, the charging roller cleaner 75 removes dust, residual toner, and the like from the charging roller 71Y to minimize creation of substandard images.

Figure 4:
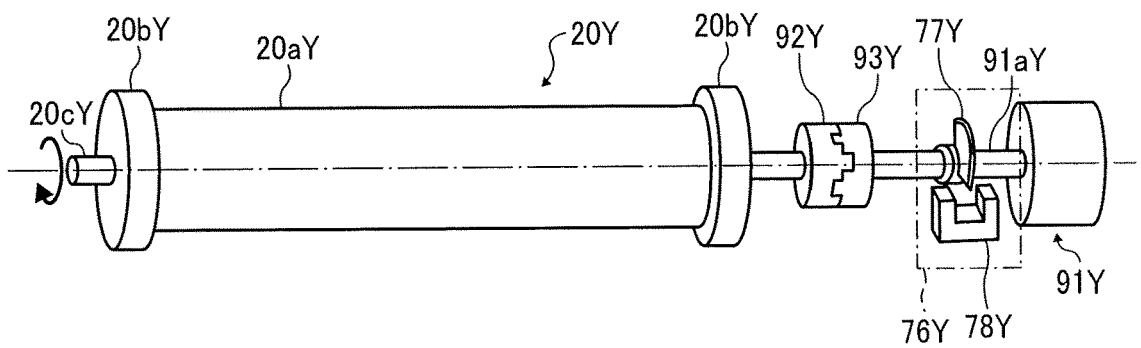
FIG. 4 is a perspective view illustrating the photoconductor for yellow.

FIG. 4 is an enlarged perspective view of the photoconductor 20Y for yellow. The photoconductor 20Y includes a columnar body 20aY, large-diameter flanges 20bY disposed at both ends of the columnar body 20aY in the axial direction thereof, and a rotation shaft 20cY rotatably supported by bearings.

One end of the rotation shaft 20cY, which protrudes from the end face of each of the two flanges 20bY, penetrates the photoconductor rotation sensor 76Y, and the portion protruding from the photoconductor rotation sensor 76Y is supported by the bearing. The photoconductor rotation sensor 76Y includes a light shield 77Y secured to the rotation shaft 20cY to rotate together with the rotation shaft 20cY, and a transmission photosensor 78Y. The light shield 77Y protrudes from a predetermined position of the rotation shaft 20cY in the direction normal to the rotation shaft 20cY. When the photoconductor 20Y assumes a predetermined rotation position, the light shield 77Y is interposed between a light-emitting element and a light-receiving element of the transmission photosensor 78Y. Accordingly, the light receiving element does not receive light. Consequently, the output voltage value significantly drops. That is, the transmission photosensor 78Y significantly decreases the output voltage detecting the position of the photoconductor 20Y.

Figure 5:
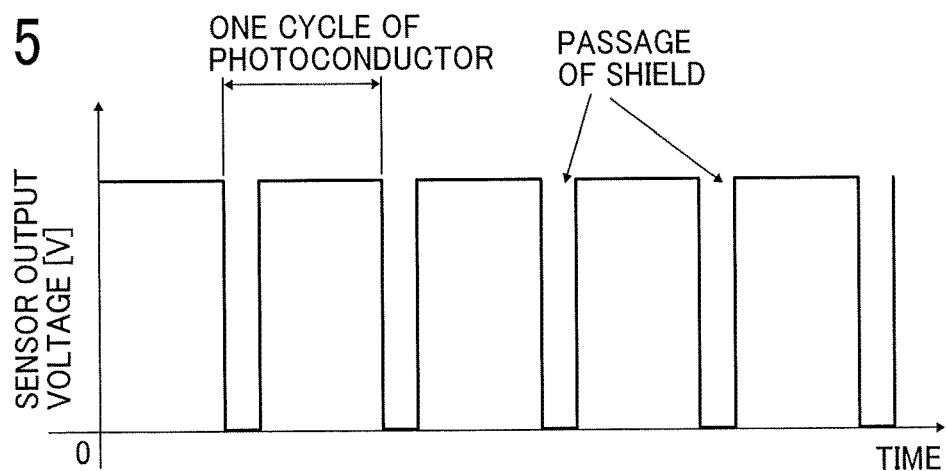
FIG. 5 is a graph illustrating change with time in an output voltage from a photoconductor rotation sensor for yellow.

FIG. 5 is a graph illustrating changes with time in an output voltage from a photoconductor rotation sensor 76Y for yellow. Specifically, the output voltage from the photoconductor rotation sensor 76Y is an output voltage from the transmission photosensor 78Y. As illustrated in FIG. 5, the photoconductor rotation sensor 76Y outputs a predetermined voltage (e.g., 6 volts) most of time during which the photoconductor 20Y rotates. However, each time the photoconductor 20Y makes a complete turn, the output voltage from the photoconductor rotation sensor 76Y instantaneously falls to nearly 0 volt. Because, each time the photoconductor 20Y makes a complete turn, the light shield 77Y is interposed between the light-emitting element and the light-receiving element of the transmission photosensor 78Y, thus blocking the light to be received by the light-receiving element. The timing of a significant decrease of the output voltage is when the photoconductor 20Y is brought to the predetermined position of rotation. Hereinafter, this timing is called "reference attitude timing."

Figure 6:
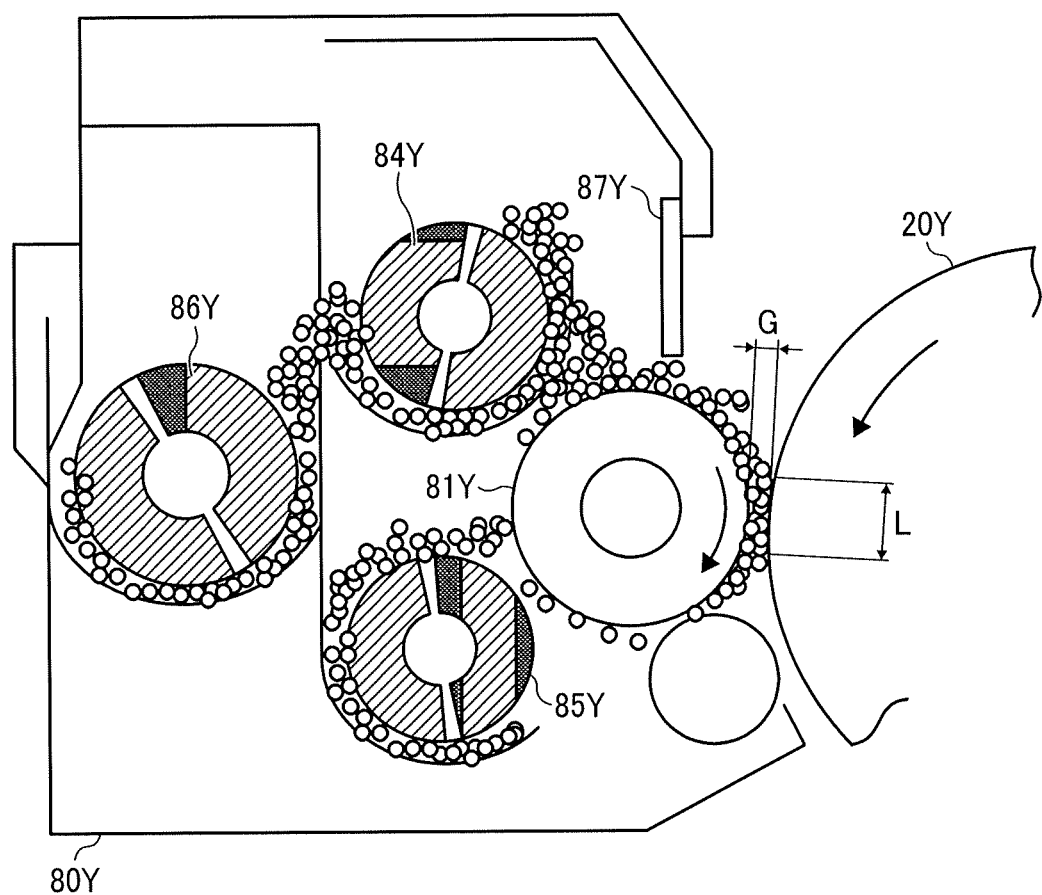
FIG. 6 is a schematic cross-sectional view of a developing device and a part of the photoconductor for yellow.

FIG. 6 is a schematic cross-sectional view of a developing device 80Y for yellow and a part of the photoconductor 20Y for yellow. The developing device 80Y employs two-component development, in which two component developer including magnetic carriers and nonmagnetic toner is used for image developing. Alternatively, one-component development using one-component developer that does not include magnetic carriers may be employed. The developing device 80Y includes a stirring section and a developing section within a development case. In the stirring section, the two-component developer (hereinafter, simply "developer") is stirred by three screws (a supply screw 84Y, a collecting screw 85Y, and a stirring screw 86Y) and is conveyed to the developing section. The developing section includes a rotary developing sleeve 81Y disposed opposite the photoconductor 20Y via an opening of the development case, across a predetermined development gap G. The developing sleeve 81Y serving as a developer bearer includes a magnet roller, which does not rotate together with the developing sleeve 81Y.

The supply screw 84Y and the collecting screw 85Y in the stirring section and the developing sleeve 81Y in the developing section extend in a horizontal direction and are parallel to each other. By contrast, the stirring screw 86Y in the stirring section is inclined to rise from the front side to the backside of the paper on which FIG. 6 is drawn.

While rotating, the supply screw 84Y of the stirring section conveys the developer from the backside to the front side of the paper on which FIG. 6 is drawn to supply the developer to the developing sleeve 81Y of the developing section. The developer that is not supplied to the developing sleeve 81Y but is conveyed to the front end of the development case in the above-mentioned direction falls to the collecting screw 85Y disposed immediately below the supply screw 84Y.

The developer supplied to the developing sleeve 81Y by the supply screw 84Y of the stirring section is scooped up onto the developing sleeve 81Y due to the magnetic force exerted by the magnet roller inside the developing sleeve 81Y. The magnetic force of the magnet roller causes the scooped developer to stand on end on the surface of the developing sleeve 81Y, forming a magnetic brush. As the developing sleeve 81Y rotates, the developer passes through a regulation gap between a leading end of a regulation blade 87Y and the developing sleeve 81Y, where the thickness of a layer of developer on the developing sleeve 81Y is regulated. Then, the developer is conveyed to a developing range opposite the photoconductor 20Y.

In the developing range, the developing bias applied to the developing sleeve 81Y causes a developing potential. The developing potential gives an electrostatic force trending to the electrostatic latent image to the toner of developer located facing the electrostatic latent image on the photoconductor 20Y. In addition, background potential acts on the toner located facing a background portion on the photoconductor 20Y, of the toner in the developer. The background potential gives an electrostatic force trending to the surface of the developing sleeve 81Y. As a result, the toner moves to the electrostatic latent image on the photoconductor 20Y, developing the electrostatic latent image. Thus, a yellow toner image is formed on the photoconductor 20Y. The yellow toner image enters a primary transfer nip for yellow as the photoconductor 20Y rotates.

As the developing sleeve 81Y rotates, the developer that has passed through the developing range reaches an area where the magnetic force of the magnet roller is weaker. Then, the developer leaves the developing sleeve 81Y and returns to the collecting screw 85Y of the stirring section. While rotating, the collecting screw 85Y conveys the developer collected from the developing sleeve 81Y from the backside to the front side of the paper on which FIG. 6 is drawn. At the front end of the developing device 80Y in the above-mentioned direction, the developer is received to the stirring screw 86Y.

While rotating, the stirring screw 86Y conveys the developer received from the collecting screw 85Y to the backside from the front side in the above-mentioned direction. During this process, a toner concentration sensor 82Y, which is a magnetic permeability sensor as an example, (described later referring to FIGS. 7A and 7B), detects the concentration of toner. Based on the detection result, toner is supplied as required. Specifically, to supply toner, a controller 110 (illustrated in FIGS. 7A and 7B) drives a toner supply device according to the readings of the toner concentration sensor. The developer to which the toner is thus supplied is conveyed to the back end of the development case in the above-mentioned direction and is received by the supply screw 84Y.

The length of the developing range (hereinafter "developing range length L") in the direction in which the developing sleeve rotates 81Y varies depending on the diameter of the developing sleeve 81Y, the development gap G, the regulation gap, and the like. As the developing range length L increases, the chance for the toner to contact the electrostatic latent image on the photoconductor 20Y increases in the developing range. Thus, the developing efficiency improves. As a result, increasing the development area length L is preferably for a high-speed printing. However, if the development area length L is too long, certain defects such as toner dispersion, toner agglomeration, and photoconductor rotation lock, may be caused. Thus, the developing range length L needs to be set in accordance with machine specifications.

The description above concerns formation of yellow images in the image forming unit 18Y for yellow. In the image forming units 18C, 18M, and 18K, cyan, magenta, and black toner images are formed on the photoconductors 20C, 20M, and 20K, respectively, through similar processes.

Figure 7A:
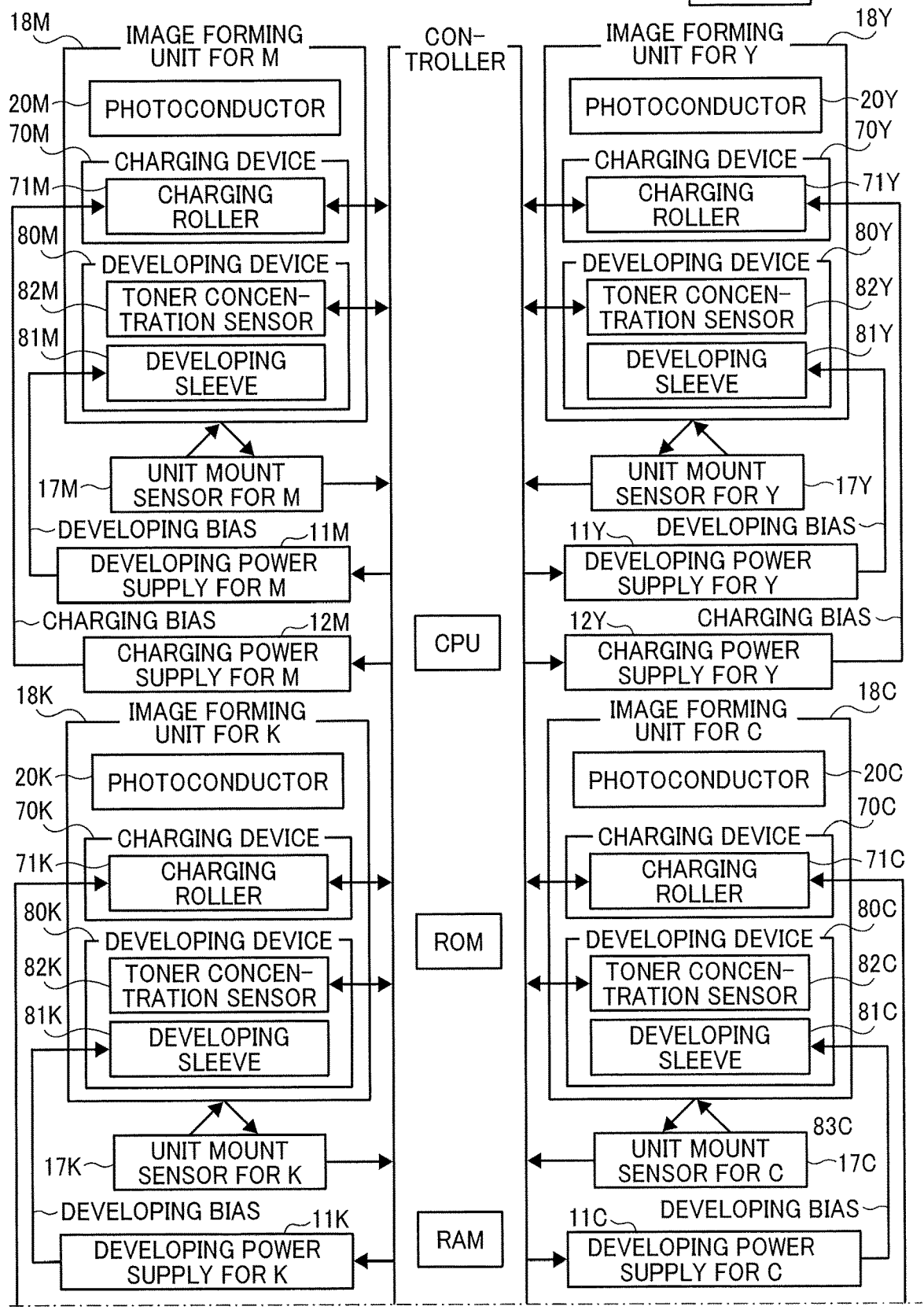
FIGS. 7A and 7B (collectively referred to as FIG. 7) are block diagrams illustrating the principal electronic circuitry of the image forming apparatus illustrated in FIG. 1.
Figure 7B:
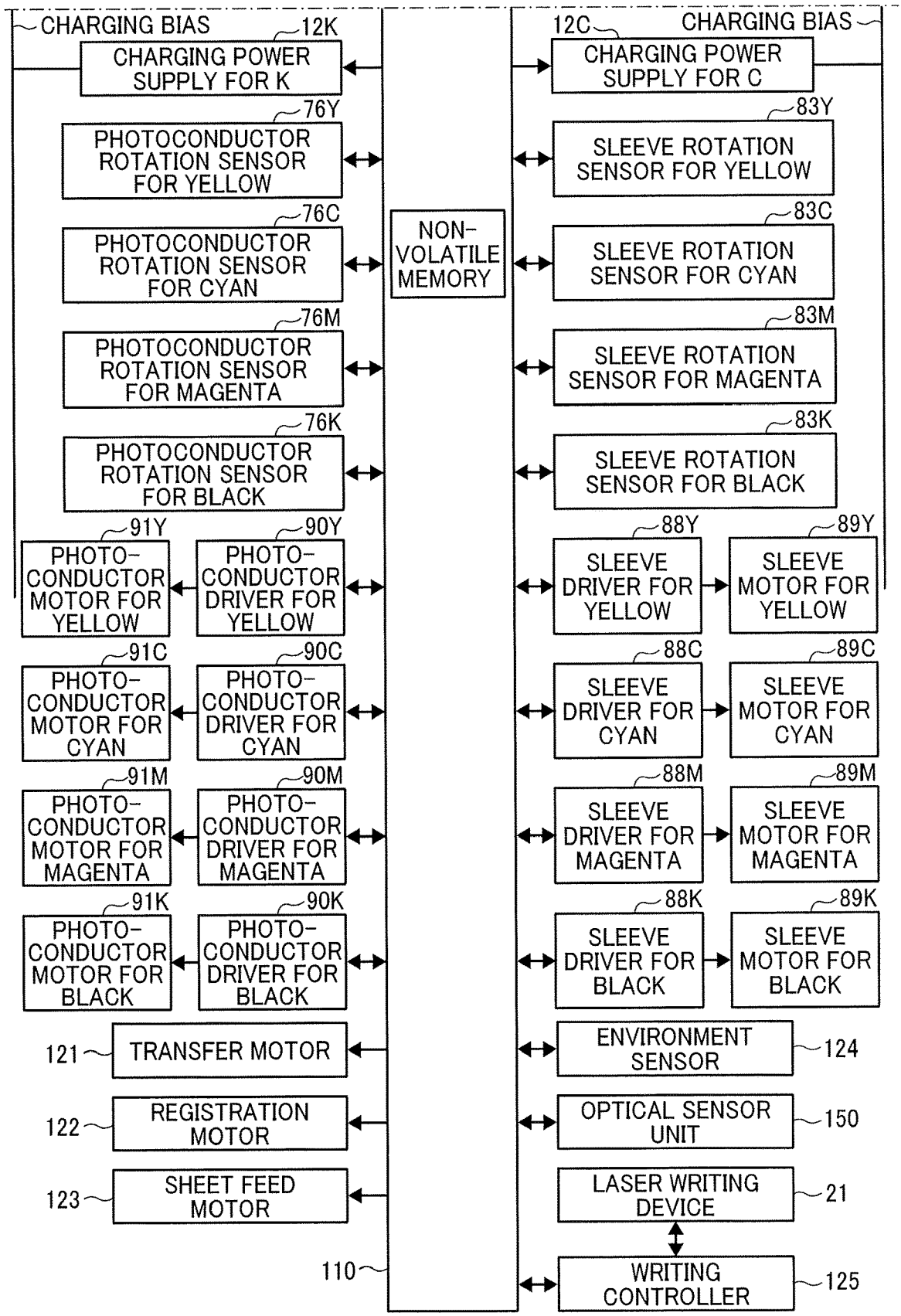

FIGS. 7A and 7B (collectively referred to as FIG. 7) are block diagrams illustrating electronic circuitry of the image forming apparatus 1 illustrated in FIG. 1. In the configuration illustrated in FIG. 7, the controller 110 includes a central processing unit (CPU), a random access memory (RAM), a read only memory (ROM), a nonvolatile memory, and the like. The controller 110 is electrically connected to the toner concentration sensors 82Y, 82M, 82C, and 82K of the yellow, magenta, cyan, and black developing devices 80Y, 80M, 80C, and 80K, respectively. With this structure, the controller 110 obtains the toner concentration of yellow developer, cyan developer, magenta developer, and black developer contained in the developing devices 80Y, 80C, 80M, and 80K, respectively.

Unit mount sensors 17Y, 17C, 17M, and 17K for yellow, cyan, magenta, and black, serving as replacement detectors, are also electrically connected to the controller 110. The unit mount sensors 17Y, 17C, 17M, and 17K respectively detect removal of the image forming units 18Y, 18C, 18M, and 18K from the image forming section 100 and mounting thereof in the image forming section 100. With this structure, the controller 110 recognizes that the image forming units 18Y, 18C, 18M, and 18K have been mounted in or removed from the image forming section 100.

In addition, developing power supplies 11Y, 11C, 11M, and 11K for yellow, cyan, magenta, and black are electrically connected to the controller 110. The controller 110 outputs control signals to the developing power supplies 11Y, 11C, 11M, and 11K respectively, to adjust the value of developing bias output from each of the developing power supplies 11Y, 11C, 11M, and 11K. That is, the values of developing biases applied to the developing sleeves 81Y, 81C, 81M, and 81K for yellow, cyan, magenta, and black can be individually adjusted.

In addition, charging power supplies 12Y, 12C, 12M, and 12K for yellow, cyan, magenta, and black are electrically connected to the controller 110. The controller 110 outputs control signals to the charging power supplies 12Y, 12C, 12M, and 12K, respectively, to adjust the value of direct current (DC) voltage in the charging bias output from each of the charging power supplies 12Y, 12C, 12M, and 12K, individually. That is, the values of direct current voltage in the charging biases applied to the charging rollers 71Y, 71C, 71M, and 71K for yellow, cyan, magenta, and black can be individually adjusted.

In addition, the photoconductor rotation sensors 76Y, 76C, 76M, and 76K to individually detect the photoconductors 20Y, 20C, 20M, and 20K for yellow, cyan, magenta, and black being in the predetermined rotation position are electrically connected to the controller 110. Accordingly, based on the detection output from the photoconductor rotation sensors 76Y, 76C, 76M, and 76K, the controller 110 individually recognizes whether or not each of the photoconductors 20Y, 20C, 20M, and 20K for yellow, cyan, magenta, and black is in the predetermined rotation position.

Sleeve rotation sensors 83Y, 83C, 83M, and 83K of the developing devices 80Y, 80C, 80M, and 80K, respectively, are also electrically connected to the controller 110. The sleeve rotation sensors 83Y, 83C, 83M, and 83K, each serving as a rotation position sensor, are similar in structure to the photoconductor rotation sensors 76Y, 76C, 76M, and 76K and configured to detect the developing sleeves 81Y, 81C, 81M, and 81K being in predetermined rotation positions, respectively. In other words, based on the detection output from the sleeve rotation sensors 83Y, 83C, 83M, and 83K, the controller 110 individually recognizes the timing at which each of the developing sleeves 81Y, 81C, 81M, and 81K takes the predetermined rotation position.

In addition, a writing controller 125, an environment sensor 124, the optical sensor unit 150, a process motor 120, a transfer motor 121, a registration motor 122, a sheet feeding motor 123, and the like are electrically connected to the controller 110. The environment sensor 124 detects the temperature and the humidity inside the apparatus. The process motor 120 is a driving source for the image forming units 18Y, 18C, 18M, and 18K. The transfer motor 121 is a driving source for the intermediate transfer belt 10. The registration motor 122 is a driving source for the registration roller pair 47. The sheet feeding motor 123 is a driving source to drive pickup rollers 202 to send out the recording sheet 5 from sheet trays 201 of the sheet feeder 200. The writing controller 125 controls driving of the laser writing device 21 based on the image data. The function of the optical sensor unit 150 is described later.

The copier according to the present embodiment performs a control operation called "process control" regularly at predetermined timings to stabilize the image density over time regardless of environmental changes or the like. In the process control, a yellow patch pattern image (a toner image) including multiple patch-shaped yellow toner images (i.e., toner patches) is formed on the photoconductor 20Y and transferred onto the intermediate transfer belt 10. Each of the patch-shaped yellow toner images is used for detecting the amount of yellow toner adhering. The controller 110 similarly forms cyan, magenta, and black patch pattern images on the photoconductors 20C, 20M, and 20K, respectively, and transfers the patch pattern images onto the intermediate transfer belt 10 so as not to overlap. Then, the optical sensor unit 150 detects a toner adhesion amount of each toner patch in the patch pattern image of each color. Subsequently, based on the readings obtained, image forming conditions, such as a developing bias reference value being a reference value of the developing bias Vb, are adjusted individually for each of the image forming units 18Y, 18C, 18M, and 18K.

The optical sensor unit 150 includes four reflective photosensors 151Y, 151C, 151M, 151K aligned in the width direction of the intermediate transfer belt 10, which is hereinafter referred to as "belt width direction," at predetermined intervals. Each reflective photosensor outputs a signal corresponding to the reflectance light on the intermediate transfer belt 10 or the patch-shaped toner image on the intermediate transfer belt 10. Three of the four reflective photosensors capture both of specular reflection light and diffuse reflection light on the belt surface and output signals according to the amount of respective luminous energies so that the output signal corresponds to the adhesion amount of the corresponding one of yellow, magenta, and cyan toners.

Figure 8:
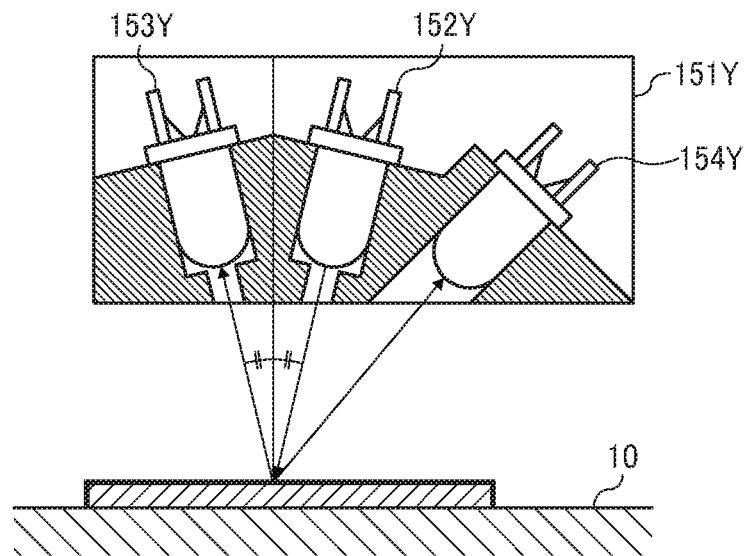
FIG. 8 is an enlarged view of a reflective photosensor for yellow mounted in an optical sensor unit.

FIG. 8 is an enlarged view of a reflective photosensor 151Y for yellow mounted in the optical sensor unit 150. The reflective photosensor 151Y includes a light-emitting diode (LED) 152Y as a light source, a light-receiving element 153Y that receives the specular reflection light, and a light-receiving element 154Y that receives the diffused reflection light. The light-receiving element 153Y outputs a voltage corresponding to the amount of specular reflection light on the surface of the yellow toner patch (patch-shaped toner image). The light-receiving element 154Y outputs a voltage corresponding to the amount of diffuse reflection light on the surface of the yellow toner patch (patch-shaped toner image). The controller 110 calculates the adhesion amount of yellow toner of the yellow toner patch based on the output voltage. The reflective photosensors 151C and 151M for cyan and magenta are similar in structure to the reflective photosensor 151Y for yellow described above.

Figure 9:
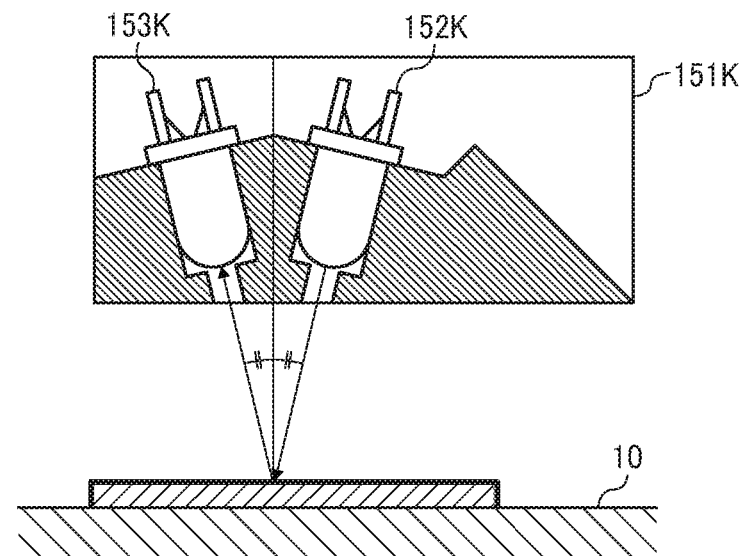
FIG. 9 is an enlarged view of a reflective photosensor for black mounted in the optical sensor unit.

FIG. 9 is an enlarged view of a reflective photosensor 151K for black, mounted in the optical sensor unit 150. The reflective photosensor 151K includes an LED 152K, serving as a light source, and a light-receiving element 153K that receives specular reflection light. The light-receiving element 153K outputs a voltage corresponding to the amount of specular reflection light on the surface of the black toner patch. The controller 110 calculates the toner adhesion amount of the black toner patch based on the output voltage.

In the present embodiment, the LED 152 for each color employs a gallium arsenide (GaAs) infrared light-emitting diode to emit light having a peak wavelength of 950 nm. For the light-receiving elements 153 to receive specular reflection and the light-receiving elements 154 to receive diffuse reflection, silicon (Si) photo transistors having a peak light receiving sensitivity of 800 nm are used. However, the peak wavelength and the peak light receiving sensitivity are not limited to the values mentioned above.

The four reflective photosensors are disposed approximately 5 millimeters from the outer face of the intermediate transfer belt 10.

The controller 110 illustrated in FIG. 7 performs the process control at a predetermined timing, such as turning on of a main power, standby time after elapse of a predetermined period, and standby time after printing on a predetermined number of sheets or greater. When the process control is started, initially, the controller 110 obtains information such as the number of sheets fed, coverage rate, and environmental information such as temperature and humidity and the controller 110 ascertains individual development properties in the image forming units 18Y, 18C, 18M, and 18K. Specifically, the controller 110 calculates development y and development threshold voltage for each color. More specifically, the controller 110 causes the charging devices 70Y, 70C, 70M, and 70K to uniformly charge the photoconductors 20Y, 20C, 20M, and 20K while rotating the photoconductors 20. In the charging, the charging power supplies 12Y, 12C, 12M, and 12K output charging biases different from those for normal printing. More specifically, of the charging bias, which is a superimposed bias including the direct current voltage and the alternating current voltage, the direct current voltage is not set constant but is gradually increased in absolute value. The laser writing device 21 scans, with the laser light, the photoconductors 20Y, 20C, 20M, and 20K charged under such conditions, to form a plurality of electrostatic latent images for the patch-shaped toner image of yellow, cyan, magenta, and black. The developing devices 80Y, 80C, 80M, and 80K develop the latent images thus formed, respectively, to form the patch pattern images of yellow, cyan, magenta, and black on the photoconductors 20Y, 20C, 20M, and 20K. In the developing, the controller 110 gradually increases the absolute value of each of developing biases applied to the developing sleeves 81Y, 81C, 81M, and 81K. At that time, the developing potential for each patch-shaped toner image, which is the difference between the developing bias and the electrostatic latent image potential of each patch-shaped toner image, is stored in the RAM.

Figure 10:
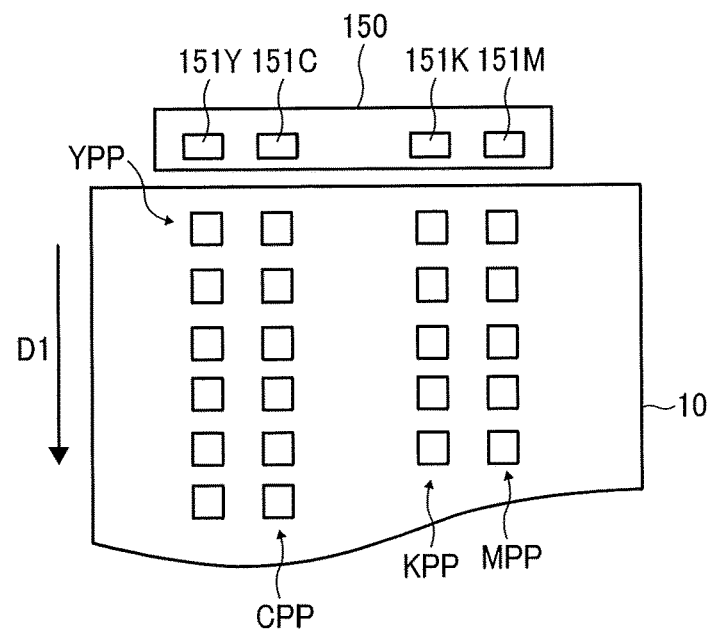
FIG. 10 illustrates a patch pattern image for each color transferred onto an intermediate transfer belt in the image forming section.

As illustrated in FIG. 10, patch pattern images YPP, CPP, MPP, and KPP of yellow, cyan, magenta, and black (collectively "patch pattern images PP") are arranged in the belt width direction so as not to overlap on the intermediate transfer belt 10. Specifically, the patch pattern image YPP is disposed on a first end side (on the left in FIG. 10) of the intermediate transfer belt 10 in the belt width direction. The patch pattern image CPP is disposed at a position shifted to a center from the patch pattern image YPP in the belt width direction. The patch pattern image MPP is disposed on a second end side (on the right in FIG. 10) of the intermediate transfer belt 10 in the belt width direction. The patch pattern image KPP is disposed at a position shifted to the center from the patch pattern image MPP in the belt width direction.

The optical sensor unit 150 includes the reflective photosensor 151Y for yellow, the reflective photosensor 151C for cyan, the reflective photosensor 151K for black, and the reflective photosensor 151M for magenta to detect the light reflection characteristics of the intermediate transfer belt 10 at different positions in the belt width direction.

The reflective photosensor 151Y is disposed to detect the amount of toner adhering to the yellow toner patches in the patch pattern image YPP on the first end side of the intermediate transfer belt 10 in the belt width direction. The reflective photosensor 151C is disposed to detect the amount of toner adhering to the cyan toner patches in the patch pattern image CPP close to the toner patch pattern YPP in the belt width direction. The reflective photosensor 151M is disposed to detect the amount of toner adhering to the magenta toner patches in the patch pattern image MPP on the second end side of the intermediate transfer belt 10 in the belt width direction. The reflective photosensor 151K is disposed to detect the amount of toner adhering to the black toner patches of the patch pattern image KPP close to the patch pattern image MPP in the belt width direction.

Based on the signals sequentially output from the four photosensors (151Y, 151C, 151M, and 151K) of the optical sensor unit 150, the controller 110 illustrated in FIG. 7 calculates the reflectance of light of the toner patches of four colors, obtains the amount of toner adhering (i.e., toner adhesion amount) to each toner patch based on the computation result, and stores the calculated toner adhesion amounts in the RAM. After passing by the position facing the optical sensor unit 150 as the intermediate transfer belt 10 rotates, the toner patch patterns PP are removed from the intermediate transfer belt 10 by a cleaning device.

Figure 11:
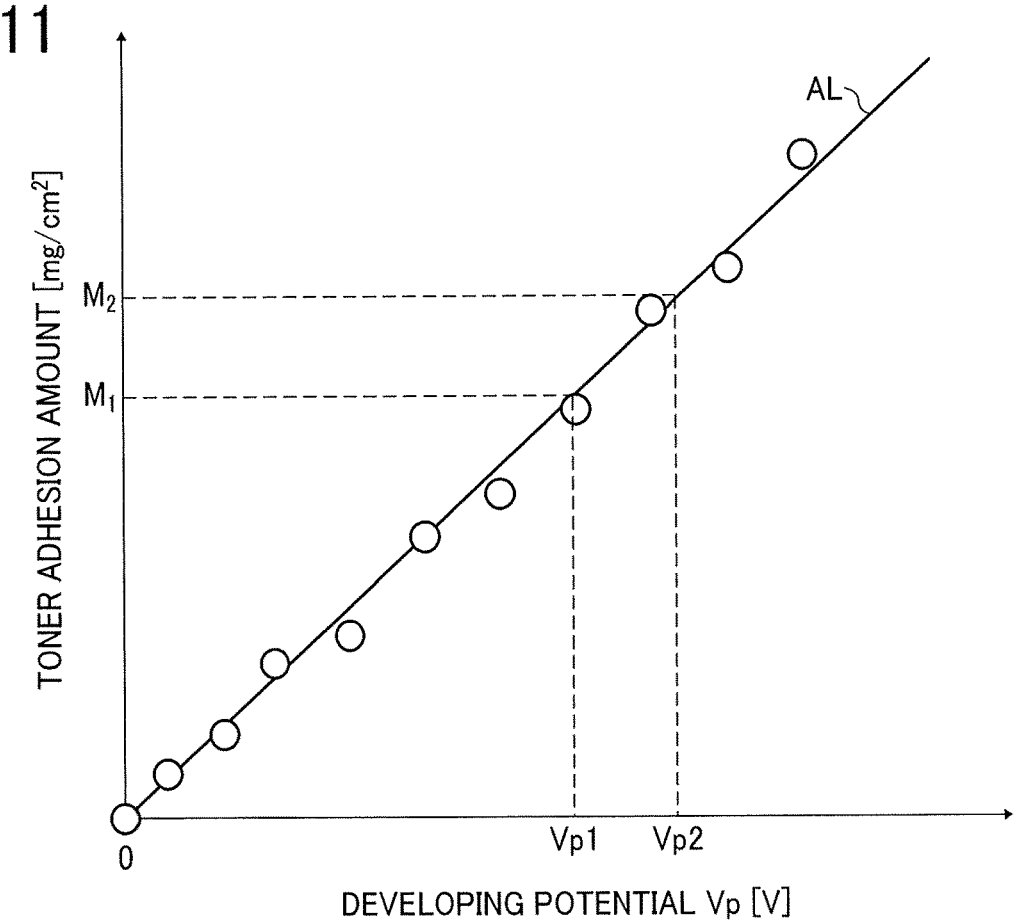
FIG. 11 is a graph of an approximation line representing a relation between a toner adhesion amount and a developing bias, constructed in process control processing.

The controller 110 illustrated in FIG. 7 calculates a linear approximation formula $Y = a \times Vp + b$, based on the toner adhesion amount stored in the RAM and data on the latent image potential and developing bias Vb regarding each toner patch stored in the RAM separately from the toner adhesion amount. Specifically, controller 110 calculates a formula of approximate straight line (AL in FIG. 11) representing the relation between the toner adhesion amount (Y-axis) and the developing potential (X-axis) in X-Y coordinate, as illustrated in FIG. 11. Based on the formula for an approximate straight line, the controller 110 obtains a developing potential Vp (e.g., Vp1 or Vp2 in FIG. 11) to achieve a target toner adhesion amount (e.g., M1 or M2 in FIG. 11) and further obtains the developing bias reference value and the charging bias reference value (and laser diode power or LD power) to achieve the developing potential Vp. The obtained results are stored in the nonvolatile memory. The controller 110 performs calculation and recording of the developing bias reference value and the charging bias reference value (and LD power) for each of yellow, cyan, magenta, and black and terminates the process control. Thereafter, when the controller 110 runs a print job, the controller 110 causes the developing power supplies 11Y, 11C, 11M, and 11K to output the developing biases Vb based on the developing bias reference value stored, for each of yellow, cyan, magenta, and black, in the nonvolatile memory. In addition, the controller 110 causes the charging power supplies 12Y, 12C, 12M, and 12K to output the charging bias Vd based on the charging bias reference value stored in the nonvolatile memory and causes the laser writing device 21 to output the LD power.

The controller 110 performs the above-described process control to determine the developing bias reference value, the charging bias reference value, and an optical writing intensity that is a laser diode power (LDP) to attain the target toner adhesion amount, thereby stabilizing the image density of the whole image regarding each of yellow, cyan, magenta, and black for a long period. However, it is possible that, as the size of the development gap between the photoconductor 20 (20Y, 20C, 20M, and 20K) and the developing sleeve 81 (81Y, 81C, 81M, and 81K) fluctuates (a phenomenon hereinafter referred to as "gap fluctuation"), image density fluctuates cyclically even within a single page.

In the image density fluctuation, image density fluctuation occurring with the rotation cycle of the photoconductors 20Y, 20C, 20M, and 20K and image density fluctuation occurring with the rotation cycle of the developing sleeves 81Y, 81C, 81M, and 81K coexist and overlap. Specifically, if the rotation axis of the photoconductor 20 (20Y, 20C, 20M, or 20K) is eccentric, the eccentricity causes gap fluctuations drawing a variation curve shaped like a sine curve per photoconductor rotation. As a result, in the developing electrical field generated between the photoconductor 20 (20Y, 20C, 20M, or 20K) and the developing sleeve 81 (81Y, 81C, 81M, or 81K), the strength of the field fluctuates, drawing a variation curve shaped like a sine curve for each round of the photoconductor 20. Fluctuations in electrical field strength cause the image density fluctuation that draws a sine curve per photoconductor rotation cycle. Further, the external shape of the photoconductor tends to have distortion. The distortion results in cyclic gap fluctuation drawing same patterns per photoconductor rotation, which cause image density fluctuation. Further, eccentricity or distortion of the external shape of the developing sleeve 81 (81Y, 81C, 81M, or 81K) causes gap fluctuation in the cycle of rotation of the developing sleeve 81 (hereinafter "sleeve rotation cycle") and results in cyclic image density fluctuation. In particular, since the image density fluctuation due to the eccentricity or distortion in the shape of the developing sleeve 81, which is smaller in diameter than the photoconductors 20, occurs in relatively short cycle, such image density fluctuation is more noticeable.

In view of the foregoing, in performing print jobs, the controller 110 illustrated in FIG. 7 performs the following processing to change outputs for each of yellow, cyan, magenta, and black. Specifically, for each of yellow, cyan, magenta, and black, the controller 110 stores, in the nonvolatile memory, output pattern data of the developing bias to cause changes in the developing electrical field strength capable of offsetting the image density fluctuation occurring in the cycle of photoconductor rotation. The controller 110 further stores, in the nonvolatile memory, developing-bias output pattern data to cause changes in the developing electrical field strength capable of offsetting the image density fluctuation occurring in the sleeve rotation cycle. Hereinafter, the former data of output pattern is referred to as "developing-bias output pattern data for photoconductor cycle" (data of developing developing-bias output pattern for photoconductor cycle). The latter developing-bias output pattern data is also referred to as "developing-bias output pattern data for sleeve cycle" (data of developing developing-bias output pattern for sleeve cycle).

The developing-bias output pattern data for photoconductor cycle, which is generated individually for yellow, magenta, cyan, and black, is a pattern for one rotation cycle of the photoconductor, and the pattern is made with reference to the reference attitude timing of the photoconductor 20. The developing-bias output pattern data is used to change the output of the developing bias from the developing power supplies (11Y, 11C, 11M, and 11K) based on the developing bias reference values for yellow, cyan, magenta, and black determined in the process control. For example, in the case of data table format, the development variation pattern includes a group of data on differences in the output developing bias at predetermined intervals in a period equivalent to one rotation cycle starting from the reference attitude timing. Leading data in the data group represents the developing bias output difference at the reference attitude timing, and second data, third data, and fourth data to later data represent the developing bias output differences at the predetermined intervals subsequent to the reference attitude timing. For example, an output pattern formed of a group of data 0, −5, −7, −9, . . . represents that the developing bias output differences are 0 V, −5 V, −7 V, −9 V . . . at predetermined intervals, respectively. To simply minimize the image density fluctuation occurring in photoconductor rotation cycle, the developing bias output from the developing power supply 11 can be a value in which the developing bias reference value is superimposed on the developing bias output difference. In the copier according to the present embodiment, however, to minimize the image density fluctuation in sleeve rotation cycle as well, the developing bias output difference to minimize the image density fluctuation in photoconductor rotation cycle and the developing bias output difference to minimize the image density fluctuation in sleeve rotation cycle are superimposed on the developing bias reference value.

The developing-bias output pattern data for sleeve cycle, which is generated individually for yellow, magenta, cyan, and black, is a pattern for one rotation cycle of the developing sleeve 81, and the pattern is made with reference to the reference attitude timing of the developing sleeve 81. The developing-bias output pattern data is used to change the output of the developing bias from the developing power supplies (11Y, 11C, 11M, and 11K) based on the developing bias reference values for yellow, cyan, magenta, and black determined in the process control (i.e., reference value determination process). In the case of data table format, leading data in the data group represents the developing bias output difference at the reference attitude timing, and second data, third data, and fourth data to later data represent the developing bias output differences at the predetermined intervals subsequent to the reference attitude timing. The predetermined intervals are identical to the intervals reflected in the data group in the developing-bias output pattern data for photoconductor cycle.

In an image forming processing, the controller 110 illustrated in FIG. 7 reads the data from the developing-bias output pattern data for photoconductor cycle, which individually corresponds to yellow, cyan, magenta, and black, at the predetermined intervals. Simultaneously, the controller 110 also reads the data of the developing-bias output pattern data for sleeve cycle, which individually correspond to yellow, cyan, magenta, and black, at the identical predetermined intervals. Regarding the reading of data from the developing-bias output pattern data for photoconductor cycle, a timing at which the photoconductor rotation sensor 76 transmits the reference attitude timing signal is used as the reference attitude timing. Regarding the reading of data from the developing-bias output pattern data for sleeve cycle, a timing at which the sleeve rotation sensor 83 transmits the reference attitude timing signal is used as the reference attitude timing.

For each of yellow, cyan, magenta, and black, in such a data reading process, the data read from the developing-bias output pattern data for photoconductor cycle and that from the developing-bias output pattern data for sleeve cycle are added together to calculate the superimposed value. For example, when the data read from the developing-bias output pattern data for photoconductor cycle indicates −5 V and the data read from the developing-bias output pattern data for sleeve cycle indicates 2 V, −5 V and 2 V are added together. Then, the superimposed value is −3 V. When the developing bias reference value is −550 V, the result of addition of the superimposed value is −553 V, which is output from the developing power supply 11. Such processing is performed for each of yellow, cyan, magenta, and black at the predetermined intervals.

With this processing, the developing electrical field between the photoconductor 20 and the developing sleeve 81 is varied in strength to offset an electrical field strength variation that is a superimposition of two types of variations in the electrical field strength. Namely, electrical field strength variation caused by the gap fluctuation in photoconductor rotation cycle, due to eccentricity or distortion in the external shape of the photoconductor 20, and electrical field strength variation in sleeve rotation cycle due to eccentricity or distortion in the external shape of the developing sleeve 81. With such processing, regardless of the rotation position of the photoconductor 20 and that of the developing sleeve 81, the developing electrical field between the photoconductor 20 and the developing sleeve 81 can be kept substantially constant. This processing can minimize the image density fluctuation occurring in both of the photoconductor rotation cycle and the sleeve rotation cycle.

The development variation output pattern data for photoconductor cycle and that for sleeve cycle, which individually corresponds to each of yellow, cyan, magenta, and black, are generated by executing a pattern process at predetermined timings. That is, the predetermined timing includes a timing before a first print job and after shipping from the factory (hereinafter called an initial startup timing), and a replacement detection timing when a replacement of the image forming unit 18Y, 18C, 18M, and 18K is detected. At the initial startup timing, the controller 110 generates the developing-bias output pattern data for photoconductor cycle for each of yellow, cyan, magenta, and black. In addition, the developing-bias output pattern data for the sleeve cycle is also generated. In contrast, in the replacement detection timing, only for the image forming unit 18 of which replacement is detected, the controller 110 generates the developing-bias output pattern data for photoconductor cycle and the developing-bias output pattern data for sleeve cycle. To enable the generation of pattern, as illustrated in FIGS. 7A and 7B, the copier includes the unit mount sensors 17Y, 17C, 17M, and 17K to individually detect the replacement of the image forming units 18Y, 18C, 18M, and 18K.

Figure 12:
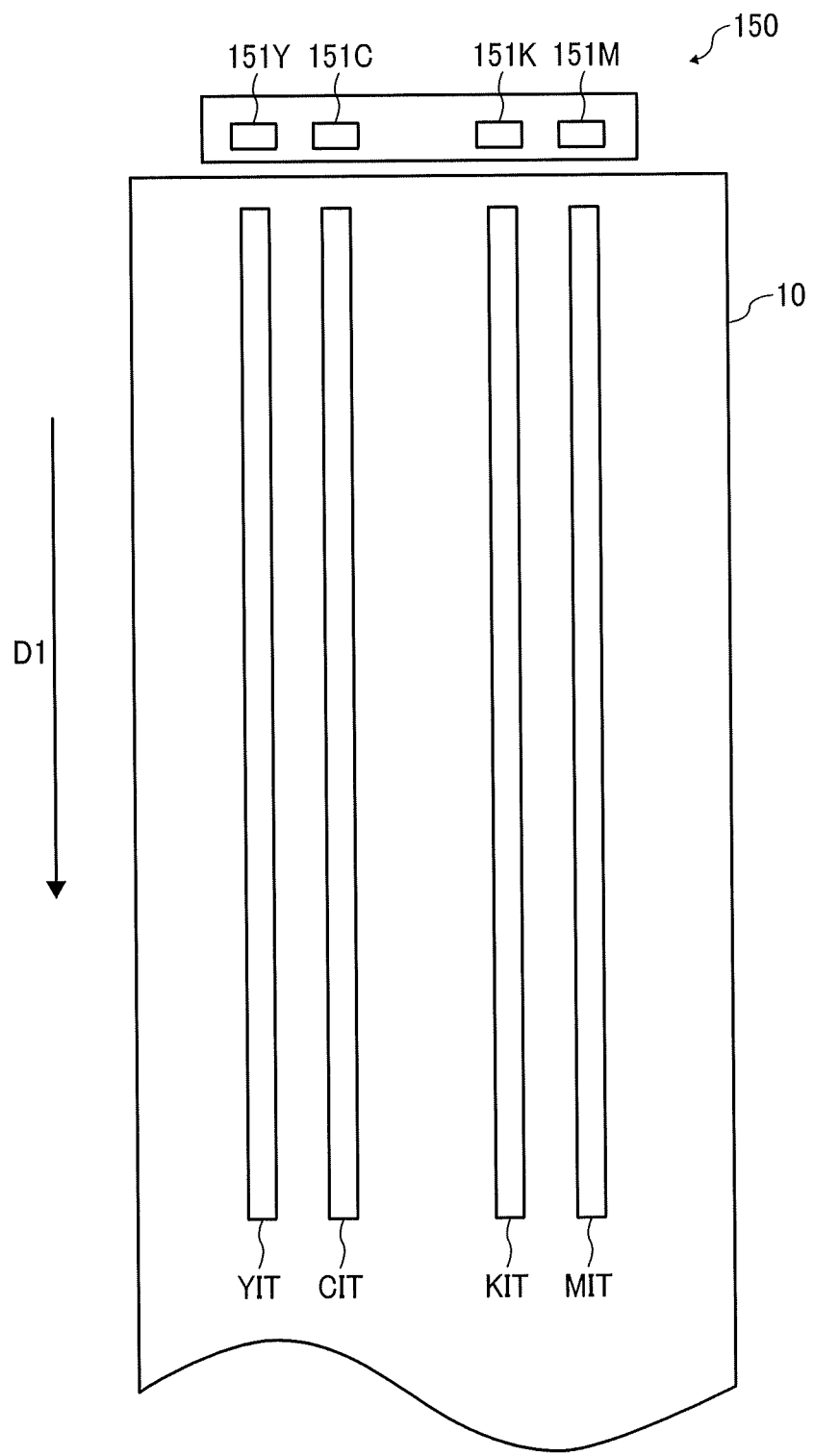
FIG. 12 is a schematic plan view illustrating a toner image for detection of solid image density fluctuation in each color transferred onto the intermediate transfer belt in the image forming section.

In the pattern process to generate the development variation output pattern at the initial startup timing, initially, a yellow toner image for detection of the solid image density fluctuation is formed on the photoconductor 20Y. In addition, a cyan toner image for detection of the solid image density fluctuation, a magenta toner image for detection of the solid image density fluctuation, and a black toner image for detection of the solid image density fluctuation are formed on the photoconductor 20C, the photoconductor 20M, and the photoconductor 20K. Then, these toner images for detection of the solid image density fluctuation are primarily transferred onto the intermediate transfer belt 10, as illustrated in FIG. 12. In FIG. 12, since the yellow toner image for detection of the solid image density fluctuation YIT is used to detect the yellow image density fluctuation in the rotation cycle of the photoconductor 20Y, the yellow toner image for detection of the solid image density fluctuation YIT is longer than the length of circumference of the photoconductor 20Y in the belt travel direction. Likewise, the cyan toner image for detection of the solid image density fluctuation, the magenta toner image for detection of the solid image density fluctuation, and the black toner image for detection of the solid image density fluctuation are longer than the lengths of circumference of the photoconductors 20C, 20M, and 20K, respectively.

In FIG. 12, for convenience, four toner images for detection of the solid image density fluctuation YIT, CIT, MIT, and KIT are aligned in the belt width direction. In practice, however, there are cases in which the positions of the toner images for detection of the image density fluctuation of different colors on the belt may be shifted from each other, at most, by an amount equivalent to the length of circumference of the photoconductor 20. This is because, for each color, formation of the toner images for detection of the image density fluctuation is started to match a leading end position of the toner images for detection of the image density fluctuation with a reference position on the photoconductor 20 (photoconductor surface position entering the developing range at the reference attitude timing) in the direction of circumference of the photoconductor 20. That is, the toner images for detection of the image density fluctuation for each color is formed such that the leading end thereof matches the reference position of the photoconductor 20 in the direction of circumference.

Instead of the solid toner images, halftone toner images may be formed as toner images for detection of an image density fluctuation. For example, a halftone toner image having a dot coverage of 70% may be formed.

Further, the controller 110 illustrated in FIG. 7 performs the pattern process together with the process control as a set of operations. Specifically, immediately before the pattern process, the controller 110 executes the process control to determine the developing bias reference value for each color. In the pattern process executed immediately after the process control, the controller 110 develops, for each color, the toner image for detection of the solid image density fluctuation with the developing bias reference value determined by the process control. Accordingly, logically, the toner image for detection of the solid image density fluctuation is developed to have the target toner adhesion amount. However, actually, minute density unevenness occurs due to the gap fluctuation.

A time lag from the start of formation of the toner image for detection of the solid image density fluctuation, that is, from a start of writing of the electrostatic latent image, to the arrival of the leading end of the toner image at a detection position by the reflective photosensor of the optical sensor unit 150 is different among the four colors. However, in the case of the same color, the time lag is constant over time, which is hereinafter referred to as "writing-detection time lag."

The controller 110 illustrated in FIG. 7 preliminarily stores the writing-detection time lag, for each color, in the nonvolatile memory. For each color, the controller 110 starts sampling of output from the reflective photosensor after the writing-detection time lag has passed from the start of formation of the toner image for detection of the solid image density fluctuation. The samplings are repeated at a predetermined interval over one cycle of rotation of the photoconductors. The predetermined interval is the same time value as the time interval of reading each data in the output pattern data used for output change processing. The controller 110 generates, for each color, an image density fluctuation graph indicating the relation between the toner adhesion amount (image density) and time (photoconductor surface position), based on the sampling data. From the image density fluctuation graph, the controller 110 extracts two fluctuation patterns of the solid image density: The first pattern is a pattern of solid image density fluctuation generated in the rotation period of the photoconductor 20. The second pattern is a pattern of solid image density fluctuation generated in the rotation period of the developing sleeve 81.

After extracting the pattern of the solid image density fluctuation in photoconductor rotation cycle based on the sampled data for each color, the controller 110 illustrated in FIG. 7 calculates an average toner adhesion amount that corresponds to an average image density. The average toner adhesion amount substantially reflects an average of the variation of the development gap in one rotary cycle of the photoconductor. Therefore, with respect to the average toner adhesion amount, the controller 110 generates the developing bias output pattern data for photoconductor cycle to offset the pattern of solid image density fluctuation in photoconductor rotation cycle. Specifically, the controller 110 calculates the bias output differences individually corresponding to a plurality of toner adhesion amounts that are included in the pattern of the solid image density fluctuation occurring in the photoconductor rotation cycle. The bias output differences are calculated with reference to the average toner adhesion amount. The bias output difference corresponding to the average toner adhesion amount is calculated as zero.

The bias output difference corresponding to the toner adhesion amount data larger in value than the average toner adhesion amount is calculated as a positive value corresponding to the difference between that toner adhesion amount and the average toner adhesion amount. Being a plus value, this bias output difference changes the developing bias, which is negative in polarity, to a value lower (smaller in absolute value) than the developing bias reference value.

Conversely, the bias output difference corresponding to the toner adhesion amount data smaller in value than the average toner adhesion amount is calculated as a negative value corresponding to the difference between that toner adhesion amount and the average toner adhesion amount. Being a minus value, this bias output difference changes the developing bias, which is negative in polarity, to a value higher (larger in absolute value) than the developing bias reference value.

Thus, the controller 110 obtains the bias output difference corresponding to each toner adhesion amount data and generates the developing-bias output pattern data for photoconductor cycle, in which the obtained bias output differences are arranged in order.

In addition, after extracting, for each color, the fluctuation pattern of solid image density in sleeve rotation cycle based on the sampling data, the controller 110 calculates an average toner adhesion amount (average image density). The average toner adhesion amount substantially reflects an average of the variation of the development gap in one rotary cycle of the developing sleeve. Therefore, with respect to the average toner adhesion amount, the controller 110 generates the developing bias output pattern data for sleeve cycle to offset the fluctuation pattern of solid image density in sleeve rotation cycle. The developing bias output pattern for sleeve cycle can be generated through processing similar to the processing to generate the developing bias output pattern data for photoconductor cycle to offset the solid image density fluctuation in photoconductor rotation cycle.

Figure 13:
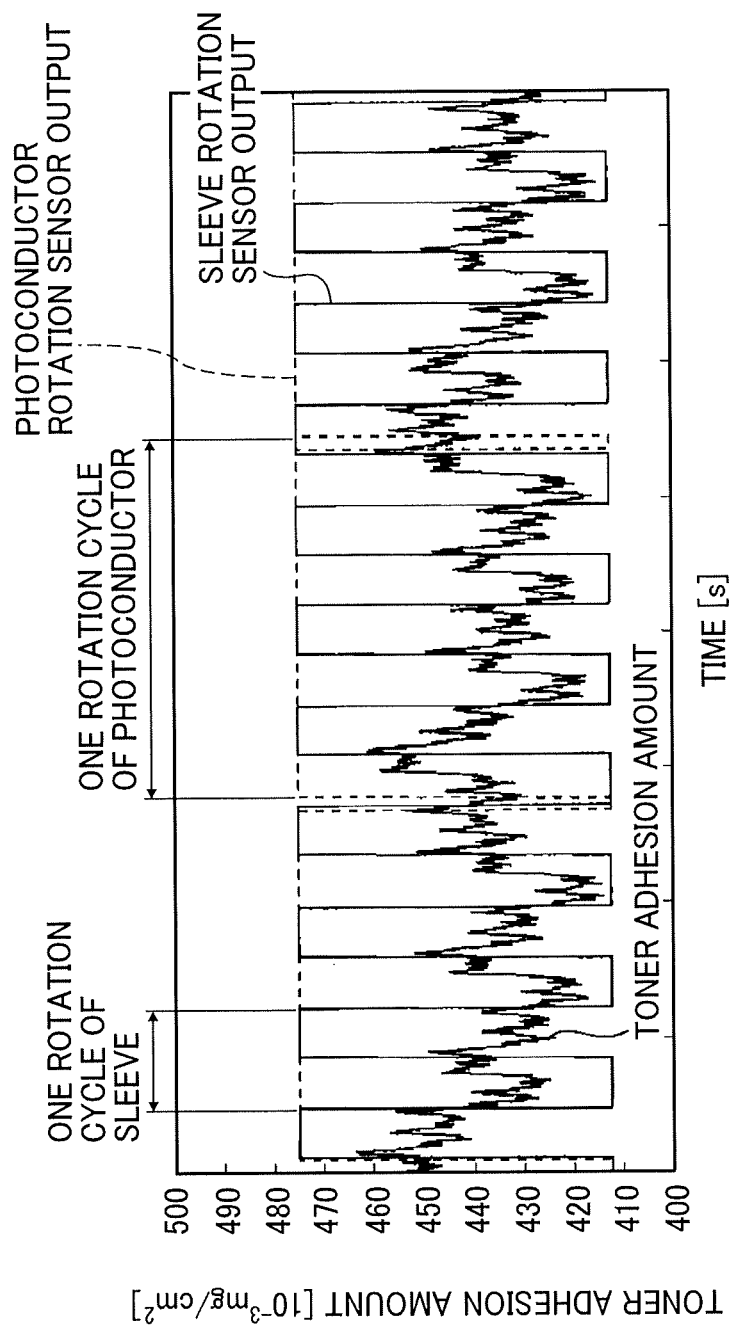
FIG. 13 is a graph illustrating a relation of periodic variations in the toner adhesion amount of the toner image for detection of the solid image density fluctuation, the output values of a sleeve rotation sensor, and the output values of a photoconductor rotation sensor.

FIG. 13 is a graph illustrating a relation of periodic variations in the toner adhesion amount of the toner image for detection of the solid image density fluctuation, the output values of a sleeve rotation sensor, and the output values of a photoconductor rotation sensor. The vertical axis of the graph represents the toner adhesion amount in $10^{-3}$ mg/cm$^2$, which is obtained by converting the output voltage from the reflective photosensor 151 of the optical sensor unit 150 according to a predetermined conversion formula. As can be seen from the graph, periodic image density fluctuation is generated on the toner images for detection of the solid image density fluctuation in the belt moving direction of the intermediate transfer belt 10.

Figure 14:
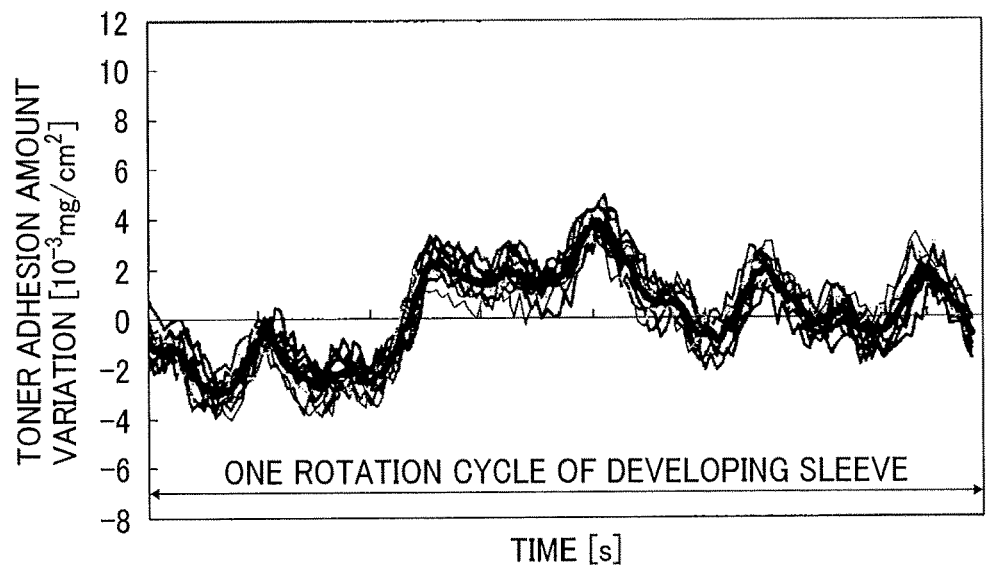
FIG. 14 is a graph illustrating an average waveform.

In generating the developing-bias output pattern data for sleeve cycle, initially, to remove the cyclic fluctuation components different from those of sleeve cycle, the controller 110 takes out data on fluctuation with time of toner adhesion amount per sleeve rotation cycle and performs averaging. Specifically, since a length of the toner image for detection of the solid image density fluctuation is more than 10 times greater than the circumferential length of the developing sleeve, the data of variations in toner adhesion amount with time is obtained over 10 rotations of the developing sleeve. Based on this data, a fluctuation waveform starting from the sleeve reference attitude timing is cut out for each sleeve rotation cycle. Thus, ten fluctuation waveforms are cut out. Subsequently, as illustrated in FIG. 14, the cut-out waveforms are superimposed, with the sleeve reference attitude timings thereof synchronized with each other, and averaged. Then, the average waveform is analyzed. The average waveform obtained by averaging the ten cutout waveforms is indicated by a thick line in FIG. 14. The individual cutout waveforms include cyclic fluctuation components deviating from those in the sleeve rotation cycle and are not smooth. By contrast, in the average waveform, deviation is reduced. In the copier according to the present embodiment, averaging is performed as to ten cut-out waveforms; however, another method may be used as long as the sleeve rotary cycle variation components can be extracted.

Figure 15:
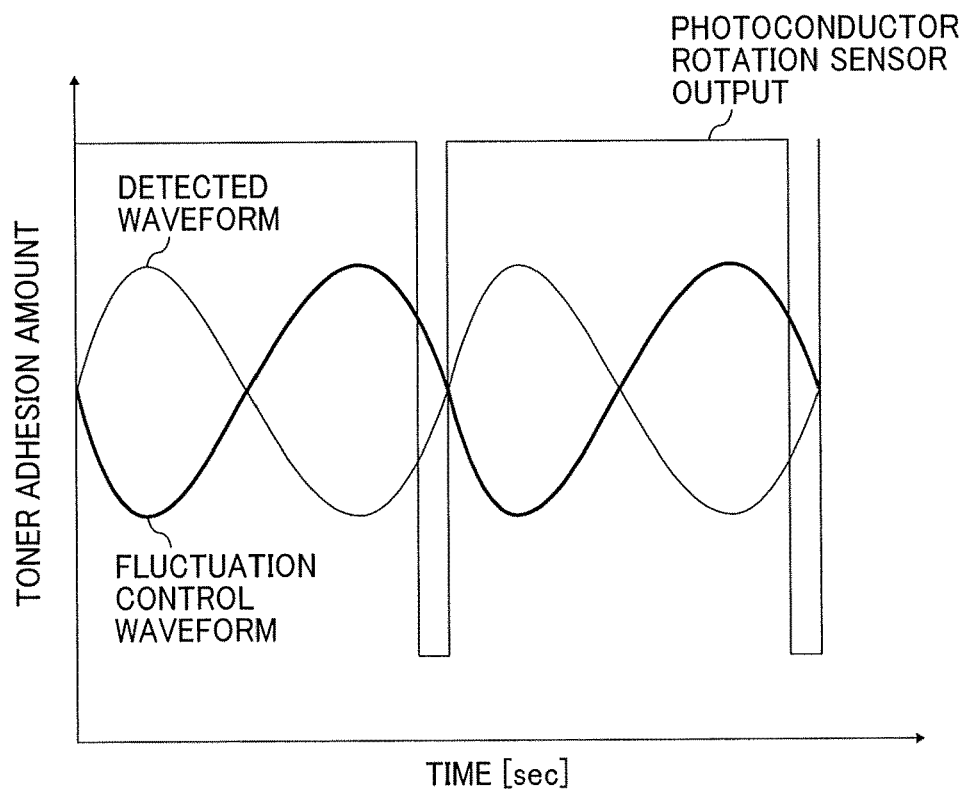
FIG. 15 is a graph illustrating the principle behind an algorithm used in generating developing-bias output pattern data.

In the copier according to the present embodiment, similarly to the developing-bias output pattern data for sleeve cycle, the developing-bias output pattern data for photoconductor cycle is generated based on the result of averaging of the waveforms cut out per photoconductor rotation cycle. To generate the developing-bias output pattern data based on the average waveform, the toner adhesion amounts are converted into developing bias variations using, for example, an algorithm that changes the developing bias to draw a fluctuation control waveform reverse in phase to the detected waveform of the toner adhesion amount illustrated in FIG. 15.

Figure 16:
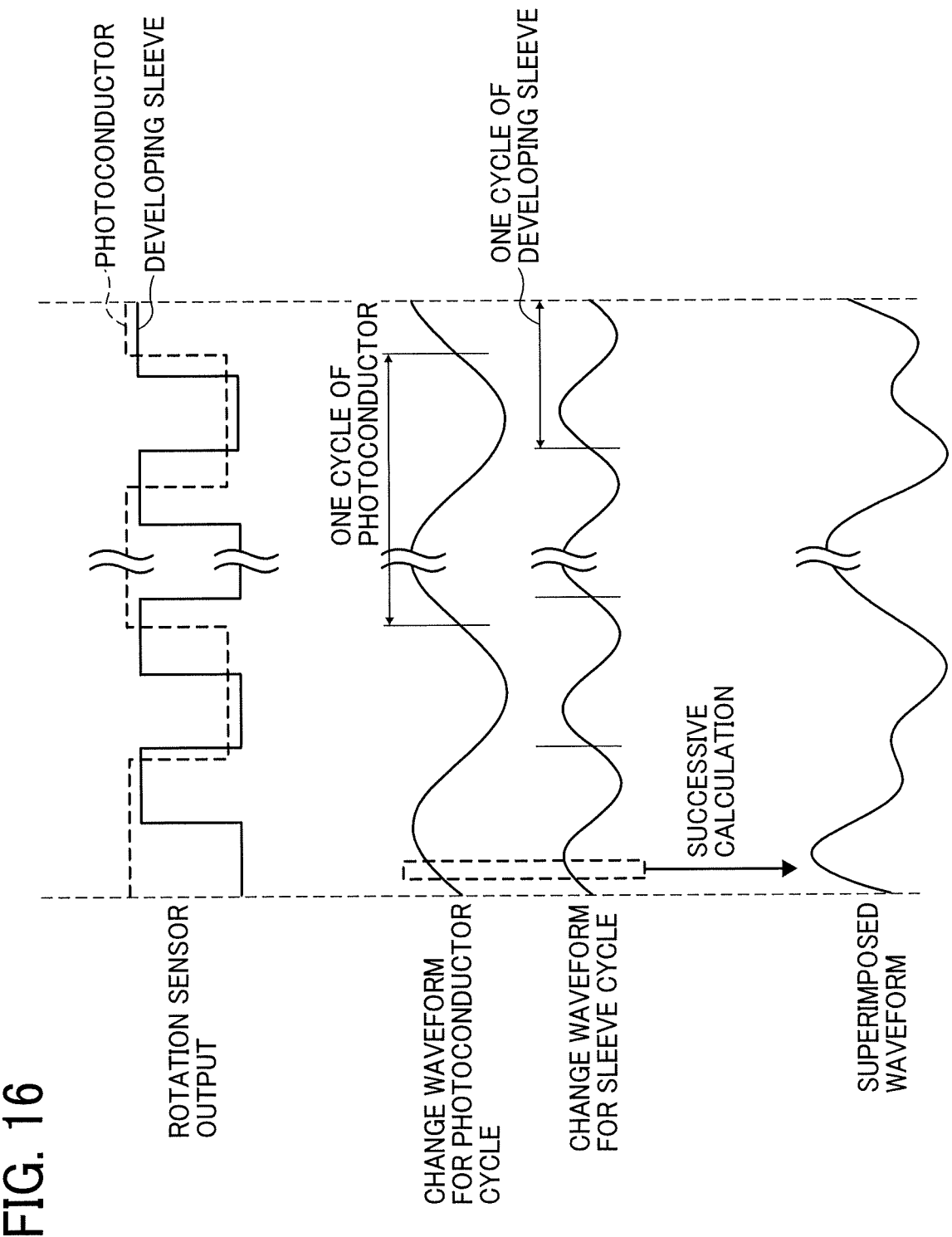
FIG. 16 is a timing chart illustrating output timing in image formation.

As described above, for each color, the output of developing bias Vb from the developing power supply (11Y, 11C, 11M, or 11K) is varied, using the development variation pattern data for photoconductor cycle and the development variation pattern data for sleeve cycle generated in the pattern process. Specifically, as illustrated in FIG. 16, the developing power supply 11 cyclically changes the developing bias in accordance with the superimposed waveform obtained by superimposing the developing bias variation waveform based on the developing-bias output pattern data for photoconductor rotation cycle and the developing bias variation waveform based on the developing-bias output pattern data for sleeve cycle. As a result, the solid image density fluctuation occurring in the photoconductor rotation cycle or that occurring in the sleeve rotation cycle can be minimized.

Next, an example of generating image density fluctuation patterns used for image density correction in the copier of the present embodiment is described.

A cyclical change of the charging bias based on charge variation pattern data may cause a cyclical image density fluctuation in a halftone portion. Such cyclic image density fluctuation is hereinafter called as "residual cyclic fluctuation." In addition to the cyclical change of the charging bias and the developing bias, a cyclical change of a latent image write intensity by the laser writing device 21, that is, a cyclical change of the luminous energy of optical writing decreases the residual cyclic fluctuation.

Therefore, when the copier of the present embodiment forms an image based on a command from a user, the controller 110 and the writing controller 125 control the laser writing device 21 to cyclically change the luminous energy of optical writing to form the latent image in addition to the cyclical change of the charging bias and the developing bias, which decrease the residual cyclic fluctuation.

Figure 17:
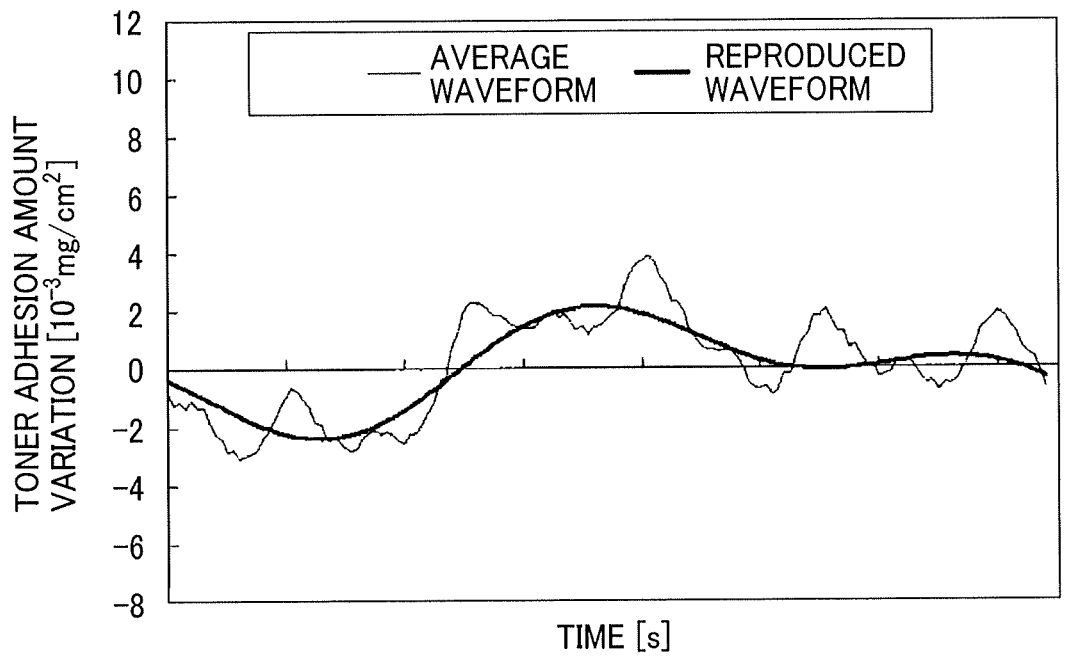
FIG. 17 is a graph illustrating changes with time of toner adhesion amount in an average waveform of waveforms cutout per sleeve rotation cycle and a reproduced waveform converted for reproduction.

FIG. 17 is a graph illustrating changes with time of toner adhesion amount in an average waveform of waveforms cutout per sleeve rotation cycle and a reproduced waveform converted for reproduction. In FIG. 17, the average waveform is obtained by averaging ten cutout waveforms cut out from the data of image density fluctuation pattern in the sleeve rotation cycle to generate the developing-bias output pattern data for sleeve cycle. The average waveform is almost completely reproduced by superimposing, multiple times, a sine wave having a cycle twenty times as long as the sleeve rotation cycle. However, the image density fluctuation inherent to the change in the developing bias decreases in follow-up capability as the frequency of bias variation becomes higher, for the following reason.

The electrostatic latent image on the photoconductor 20 is developed when the electrostatic latent image is located within the developing range having the developing range length L illustrated in FIG. 6. In a period during which the electrostatic latent image enters and exits the developing range, even if the output value of the developing bias is finely changed, it is difficult to finely vary the amount of toner adhering (image density) to the electrostatic latent image following the change in the output value of the developing bias. An average bias value in the above-mentioned period greatly affects the image density when the electrostatic latent image is developed, and instant bias changes do not much affect the image density. If the developing range length L is extremely shortened to avoid this phenomenon, the necessary developing power is not obtained. Thus, there is a limit on the frequency of cyclic fluctuation component of the image density that can be minimized by changing the developing bias.

From this reason, in the copier according to this embodiment, the upper limit of frequency of cyclic fluctuation component of the image density to be extracted, is set to three times as large as the sleeve rotation cycle. Specifically, a sine wave having a cycle three times as long as the sleeve rotation cycle is superimposed multiple times to reproduce the average waveform. The reproduced waveform illustrated in FIG. 16 is obtained by such reproduction. The controller 110 generates, based on the reproduced waveform, the developing-bias output pattern data for photoconductor rotation cycle and the developing-bias output pattern data for sleeve cycle.

Detailed procedures of the method of generating pattern data are described as follows. First, the controller 110 performs frequency analysis on the average waveform. The frequency analysis is performed based on a fast Fourier transform (FFT) or a quadrature detection. The copier of the embodiment performs it by the quadrature detection.

The average waveform as illustrated in FIG. 17 is represented by the superimposition of a sine wave cyclically varying at a frequency that is an integral multiple of the sleeve rotation cycle, as expressed in the following formula. In the following formula, x is an upper limit of the frequency of variation of the sine wave.

$$f(t)=A1\times\sin(\omega t+\theta 1)+A2\times\sin(2\times\omega t+\theta 2)+A3\times\sin(3\times\omega t+\theta 3)+\ldots+A\times X\sin(x\omega t+\theta x).$$

The above formula can be transformed into the formula below.

$$f(t)=\Sigma A1\ x\ \sin(i\ x\ \omega t+\theta i),$$

Wherein, i is a natural number of 1 to x.
The parameters in the formulas are as follows.
f(t): Average waveform of cutout waveforms of fluctuations in toner adhesion amount [$10^{-3}$ mg/cm$^2$]
Ai: Amplitude of sine wave [$10^{-3}$ mg/cm$^2$]
ω: Angular speed of the sleeve or the photoconductor [rad/s];
θi: phase of the sine wave [rad/s]; and
t: time [s].

In the embodiment, Ai and θi are calculated through quadrature detection, and the image density fluctuation component per frequency is calculated. Then, the controller 110 generates the reproduced waveform to generate the developing-bias output pattern data for sleeve cycle and the reproduced waveform to generate the developing-bias output pattern data for photoconductor cycle, based on the following formula:

$$f1/2(t)=\Sigma Ai\times Ai\times\sin(i\times\omega t+\theta)$$

wherein
"i" is from 1 to 3, and
For example, when i=1, Ai×sin (i×ωt+θi) is a sinusoidal wave having the same cycle as that of the sleeve or the photoconductor.

Although the description above concerns generation of the developing-bias output pattern data, the charge variation pattern data is generated similarly.

Figure 18:
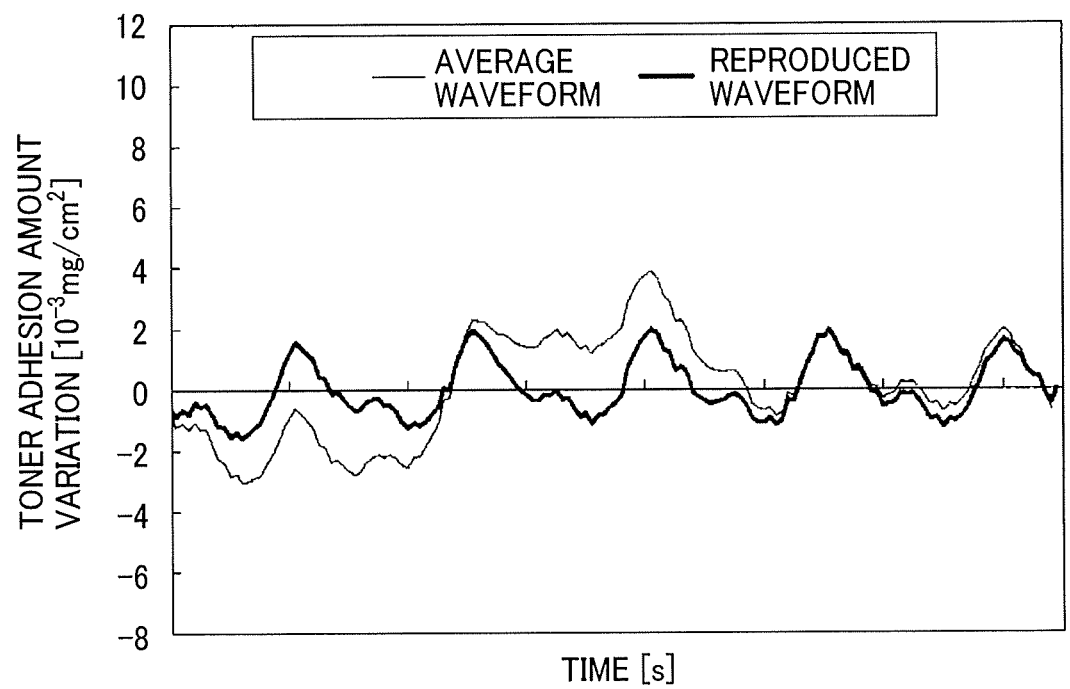
FIG. 18 is a graph illustrating changes with time of toner adhesion amount in an average waveform and a reproduced waveform converted for reproduction that are referred to when a luminous energy output pattern data is generated to change a luminous energy of optical writing.

FIG. 18 is a graph illustrating changes with time of toner adhesion amount in an average waveform and a reproduced waveform in which the average waveform is converted for reproduction. The average waveform and the reproduced waveform are referred to when luminous energy output pattern data is generated to change the luminous energy of optical writing. The copier according to the embodiment changes the luminous energy of optical writing on the photoconductor based on the luminous energy output pattern data during a print job, which decreases the residual cyclic variation of the image density. The controller 110 generates the luminous energy output pattern data based on the image density fluctuation pattern of the solid toner images for image density fluctuation detection formed to generate the developing-bias output pattern data. The controller 110 generates the developing-bias output pattern data and the charge variation pattern data, as described above, based on the reproduced waveform extracted up to a frequency variation component of a frequency three times the sleeve rotational frequency. As a result, high frequency cyclic variation component remains as the image density fluctuation. This is the residual cycle variation of the image density of the copier according to the embodiment. This residual cyclic variation pattern can be detected based on the fluctuation pattern of the solid image density acquired from the toner image for detection of the solid image density fluctuation formed to generate the developing-bias output pattern data. The image density fluctuation due to fluctuations in the luminous energy of optical writing can be generated in a unit of dot, and therefore can be used as a useful method to cancel out the periodic fluctuation component that is generated in high frequency. Then, the controller 110 generates the reproduced waveform to generate the luminous energy output pattern data for sleeve cycle and the reproduced waveform to generate the luminous energy output pattern data for photoconductor cycle, based on the following formula:

$$f3(t)=\Sigma Ai \times \sin(i\omega t+\theta i),$$

Wherein, i is a natural number from 4 to 20.

FIG. 18 illustrates the reproduced waveform generated by the calculation described above. The controller 110 generates, based on the reproduced waveform, the luminous energy output pattern data for photoconductor rotation cycle and the luminous energy pattern data for sleeve rotation cycle. Based on the data, the controller 110 corrects the luminous energy of optical writing, which is the optical-writing intensity, that is, a laser diode power (LDP) [%]. By multiplying the luminous energy of optical writing by the gain as appropriate, the high-frequency component of the image density fluctuation for the target image density can be reduced. Exposure intensity, which is a LD power, in this disclosure periodically changes to cancel the high-frequency component that is indicated with a bold line in the graph of FIG. 13.

When forming toner images based on instructions by a user, the controller 110 generates the following superimposed variation pattern data based on the luminous energy output pattern data for photoconductor rotation cycle, the luminous energy output pattern data for sleeve rotation cycle, the reference photoconductor attitude timing, and the reference developing sleeve attitude timing.

Specifically, the superimposed variation pattern data generates a superimposed variation waveform in which the luminous energy variation waveform for the photoconductor rotation cycle, and the luminous energy variation waveform for the sleeve rotation cycle are superimposed. The superimposed variation pattern data is sequentially sent from the controller 110 to the write controller 125. The write controller 125 cyclically changes the luminous energy of optical writing based on the superimposed variation pattern data.

The above-described operation is performed individually on the yellow, magenta, cyan, and black toner image formations.

Figure 19:
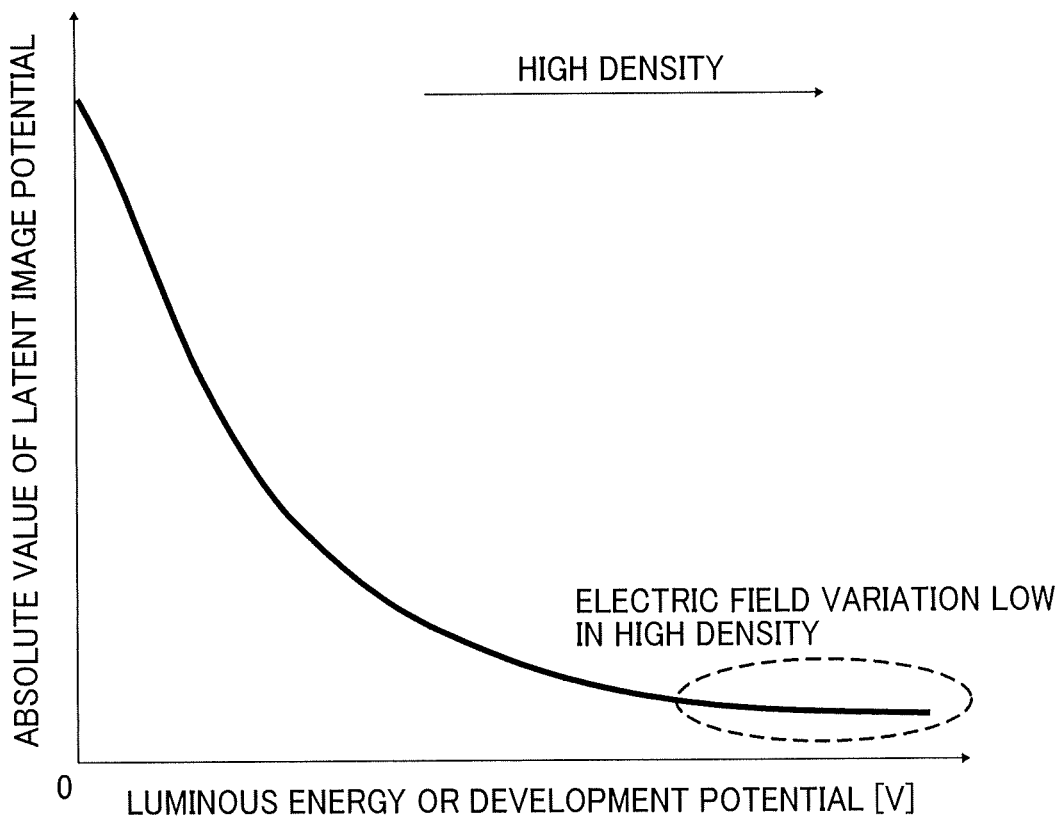
FIG. 19 is a graph illustrating a relation between an absolute value of a latent image potential and the luminous energy of optical writing or a development potential.

Such processing can effectively decrease the high frequency residual cyclic variation remaining even though the developing bias and the charging bias have been cyclically changed. In addition, the following effect is obtained: As illustrated in FIG. 19, due to the light attenuation characteristic of the photoconductor, since an electrical field variation becomes small in a high image density region, there is a limit to the width that can be corrected because a small variation in a latent image potential in the high image density region results in a narrow correction range in the toner adhesion amount. In general, an amplitude of the cyclic image density fluctuation occurring in the sleeve rotation cycle or the photoconductor rotation cycle is larger in the low frequency component and is smaller in the high-frequency component. In the copier according to the embodiment, cyclically changing the developing bias and the charging bias decreases the low frequency component of the image density fluctuation having a large amplitude. By contrast, correction of the luminous energy of optical writing decreases the high frequency cyclic variation component of the image density fluctuation having a relatively smaller amplitude. This processing prevents saturation of the luminous energy of optical writing in its upper limit in the high image density region and enables to keep a target control range of a latent image potential.

Figure 20:
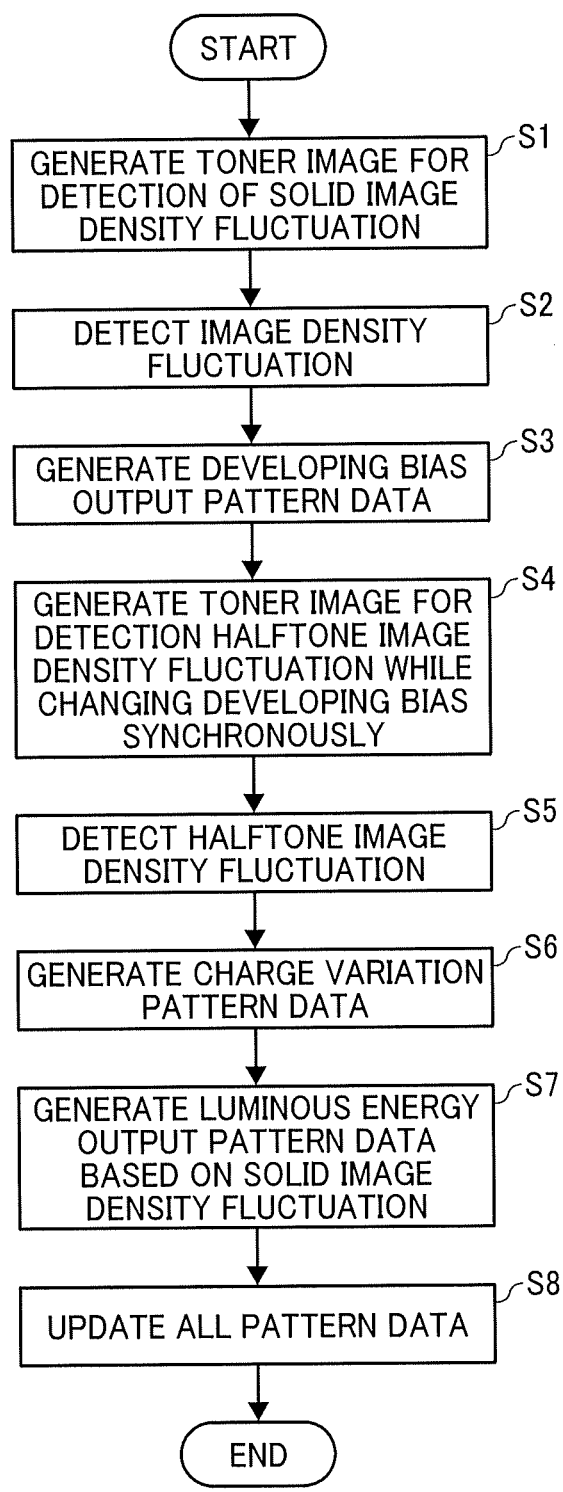
FIG. 20 is a flowchart illustrating steps in a process of a control performed by a control device that is a controller and an exposure controller of the image forming apparatus 1.

FIG. 20 is a flowchart illustrating steps in a process of a control performed by a control device that is the controller 110 and the writing controller 125 of the image forming apparatus 1. The controller 110 generates the toner image for detection of the solid image density fluctuation in step S1 keeping the developing bias, the charging bias, and the luminous energy of optical writing constant. Subsequently, the controller 110 executes detection of the image density fluctuation in the toner image for detection of the solid image density fluctuation in step S2 and generates the developing-bias output pattern data based on the detected image density fluctuation in step S3. Thereafter, while the developing bias is cyclically being varied based on the developing-bias output pattern data, the controller 110 generates a toner image for detection of halftone image density fluctuation in step S4 and executes detection of the halftone image density fluctuation in the toner images for detection of halftone image density fluctuation in step S5. Further, the controller 110 generates the charge variation pattern data based on the above-described halftone image density fluctuation in step S6. Thereafter, in step S7, the controller 110 and the writing controller 125 generates the luminous energy output pattern data based on the image density fluctuation in the toner images for detection of the solid image density fluctuation detected in step S2. In step S8, the developing-bias output pattern data, the charging variation pattern data, and the luminous energy output pattern data, which have been stored until a timing immediately before the start of this operation are updated to new data obtained by the operation. The above-described operation flow is performed individually on the yellow, magenta, cyan, and black toner images. The controller 110 may perform sequential processes with one color toner image at a time or two color toner images in parallel.

Figure 21:
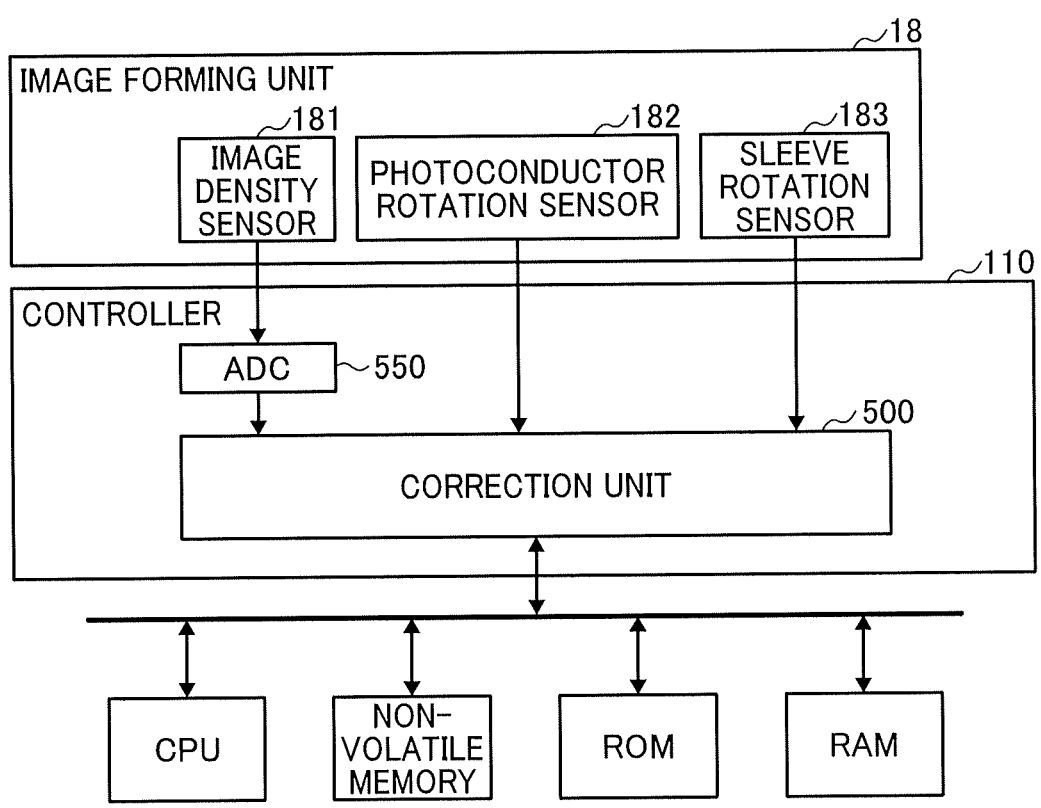
FIG. 21 is a schematic block diagram of a functional configuration of a principal part of the image forming apparatus in the first embodiment of the present disclosure.

FIG. 21 is a schematic block diagram of a functional configuration of a part of the image forming apparatus 1 in the first embodiment of the present disclosure. To describe the blocks that execute read out of an image density sensor, analog-to-digital conversion, and the correction, which are main functions in the first embodiment of the present disclosure, reference is made to FIG. 21, which is the schematic block diagram illustrating the relevant blocks in the image forming unit 18 and the controller 110 that are extracted from the block diagram in FIG. 7 illustrating the electronic circuitry of the image forming apparatus 1. The image forming unit 18 includes an image density sensor 181, the photoconductor rotation sensor 182, and the developing sleeve rotation sensor 183. The controller 110 includes a correction unit 500, an Analog to Digital Converter (ADC) 550, a CPU, a nonvolatile memory, a ROM, and a RAM.

ADC 550 executes analog-to-digital conversion of the value obtained by the image density sensor 181 that reads the toner images for detection of the solid image density fluctuation and the halftone image density fluctuation that are used to get the developing-bias output pattern data, the charge variation pattern data, and the luminous energy output pattern data, and the correction unit 500 executes a correction control based on image densities detected by the image density sensor 181.

Figure 22:
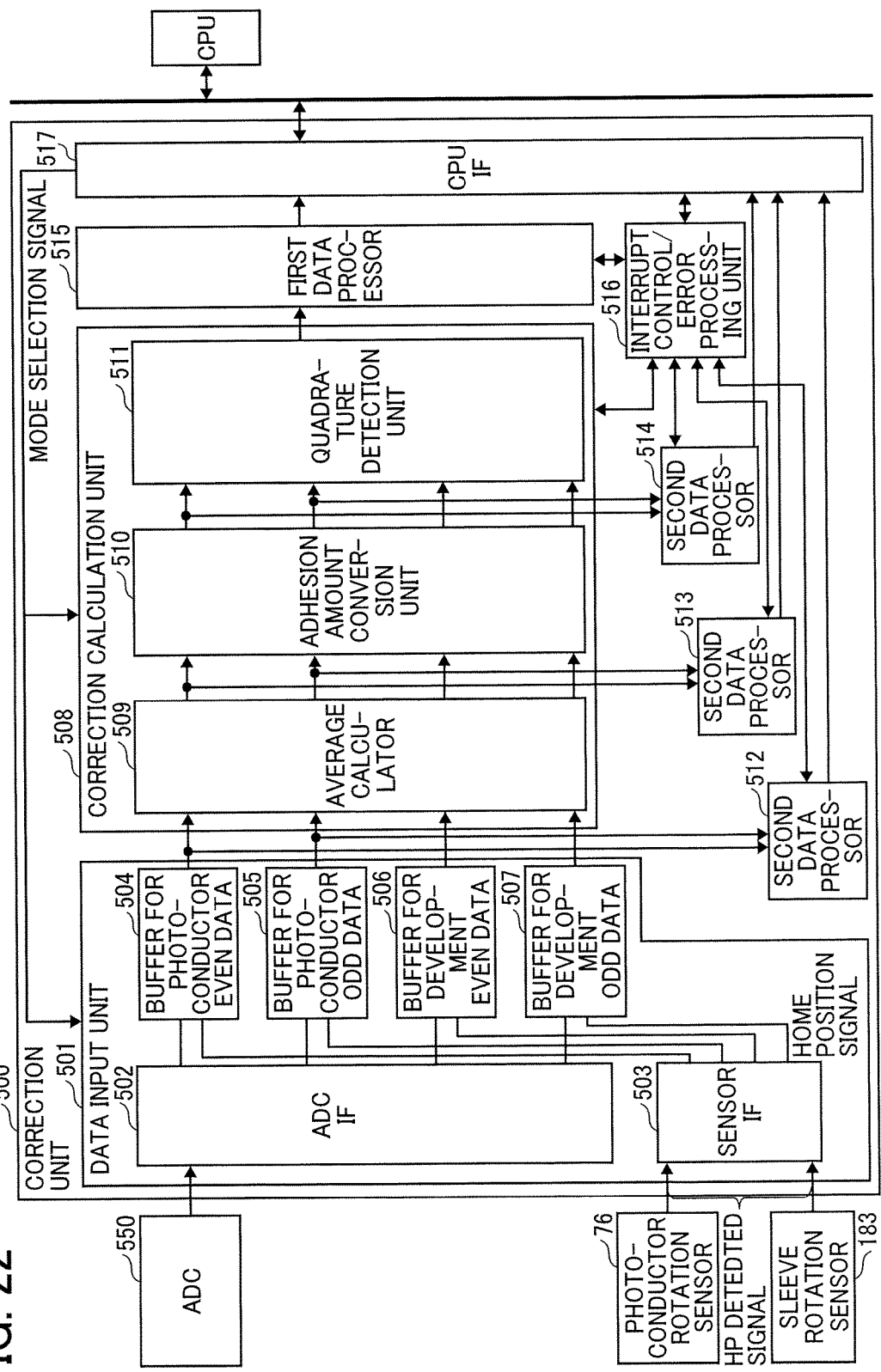
FIG. 22 is a schematic block diagram illustrating an example of a functional configuration of a correction unit in the first embodiment of the present disclosure.

FIG. 22 is a block diagram of a functional configuration of the correction unit 500 illustrated in FIG. 21 according to the first embodiment of the present disclosure. The correction unit 500 includes a data input unit 501, a correction calculation unit 508, a first data processor 515, second data processors 512 to 514, an interrupt control/error processing unit 516, and a CPU IF unit 517. The data input unit 501 includes an ADCIF 502, a sensor IF 503, a buffer for photoconductor even data 504, a buffer for photoconductor odd data 505, a buffer for development even data 506, and a buffer for development odd data 507. The correction calculation unit 508 includes an average calculator 509, an adhesion amount conversion unit 510, and a quadrature detection unit 511.

The data input unit 501 acquires the image density value transmitted from the ADC 550 via the ADCIF 502 and home position detection signals output from the photoconductor rotation sensor 182 or the sleeve rotation sensor 183 via the sensor IF. Hereinafter, a home position signal is referred to as an "HP signal". The correction unit 500 can specify a period from a reception of the HP signal to the reception of the next HP signal as a cycle of an actual rotation of a rotating body such as the photoconductor 20 or the developing sleeve 81. Since the image density value is input as serial data, serial to parallel conversion is performed. Also, since the image density values are successively input at every acquisition timing, the data input unit 501 includes a buffer to store data. The buffer is prepared for every even number of rotations (0, 2, 4, . . . , rotations) and every odd number of rotations (1, 3, 5, . . . , rotations) of each rotating body.

Data to be stored in the buffer is sequentially and consecutively input from the ADC 550, cut out per one turn of each rotating body, and stored in the buffer prepared for each rotating body. That is, the data input sequentially and consecutively is cut out at the timing of the HP signal of each rotating body and input to each buffer.

In the correction calculation unit 508, the average calculator 509 performs the averaging described above, the adhesion amount conversion unit 510 converts the data outputted from the average calculator 509 to the toner adhesion amount, and the quadrature detection unit 511 performs the quadrature detection. These calculations are executed in every even number of rotations (0, 2, 4, . . . , rotations) and every odd number of rotations (1, 3, 5, . . . , rotations) for each rotating body. The correction calculation unit 508 may execute calculations of even number of rotations and odd number of rotations in parallel. That is, the correction calculation unit 508 may independently have circuits that execute operations of even number of rotations or odd number of rotations.

The first data processor 515 stores the calculation result calculated in the correction calculation unit 508. When the predetermined operation is completed and the calculation result is stored, the first data processor 515 transmits an end interrupt signal to the interrupt control/error processing unit 516. The CPU IF unit 517 interfaces the correction unit 500 and the CPU. When the CPU detects the end interrupt signal from the interrupt control/error processing unit 516, the CPU reads the calculation result data stored in the first data processor 515 via the CPU IF 517. The second data processors 512 to 514 and the mode selection signal is described later.

Figure 23:
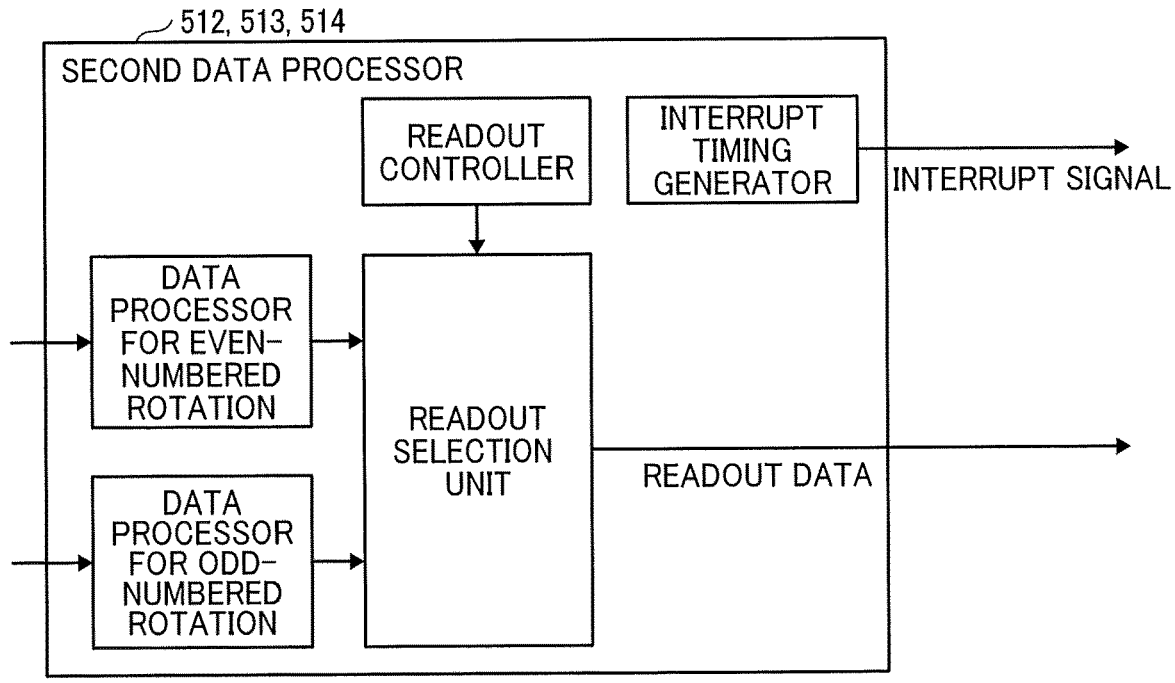
FIG. 23 is an explanatory diagram to describe details of a second data processor in the first embodiment of the present disclosure.

FIG. 23 is an explanatory diagram to describe details of the second data processors in the first embodiment of the present disclosure. The second data processors 512 to 514 stores calculation data in a calculation process of the correction calculation unit 508. Hereinafter, each of the second data processors 512 to 514 is referred to as the second data processor unless distinction is needed. The second data processor serves as a block to store the ADC acquired data, the averaged data, and the adhesion amount conversion value as inputs and transferring them to the CPU, respectively. The second data processors 512 to 514 include a data processor for even-numbered rotation, a data processor for odd-numbered rotation, a readout controller, a readout selection unit, and an interrupt timing generator.

As illustrated in FIG. 23, since the above-described data are sequentially and continuously generated in every even number rotation and every odd number rotation during data acquisition from the ADC, the second data processor stores the data generated in the even-numbered rotation in the data processor for even-numbered rotation and the data generated in the odd-numbered rotation in the data processor for odd-numbered rotation. As a memory, FIFO (first in first out: a memory of the type in which the data input first is output first) is used, and a control is executed to read out the data before the memory becomes full. The FIFO has an advantage that the FIFO can decrease a memory capacity because the FIFO divides a total data transfer amount into a plurality of read transfers and does not need a memory capacity of the total data transfer amount. Examples in which the second data processor is used for each necessary process are described below.

In a first example, the second data processor is used for the process control correction. In the process control correction, there are a plurality of correction processes requiring ADC acquired data, averaged data, and adhesion amount conversion values, respectively. The correction unit 500 of the present disclosure includes a second data processor for each necessary data processing. Each of the second data processors transfers the ADC acquired data, the averaged data, and the adhesion amount conversion data at a predetermined timing. Based on the transferred data, the CPU can execute a plurality of correction processes at a predetermined timing, which improves the degree of freedom and the expandability of the correction calculation process.

In a second example, the second data processor is used for a correction without quadrature detection. In the case of correction without quadrature detection, there is no need to consider rotation unevenness of the rotating body, so it is not necessary to acquire data synchronized with the starting point of the HP signal. Therefore, the second data processor does not need to execute the processing for every cycle of the rotating body. The correction can be done by using only one systematic data, that is, data of either data of even-numbered rotation or data of odd-numbered rotation.

In a third example, the second data processor is used for a correction with quadrature detection. The embodiment of the present disclosure uses the quadrature detection, and the CPU reads out the adhesion amount conversion data that become input of the quadrature detection. In the correction with quadrature detection, it is possible to select a hardware structure that includes a circuitry for quadrature detection or a software program in which the CPU reads out the adhesion amount conversion data and executes the quadrature detection calculation. The hardware structure is excellent in calculation speed, and the software program is excellent in the degree of freedom and the expandability of the correction calculation process.

In a fourth example, the second data processor is used for a startup of the correction calculation. Parameter design is necessary to start up the correction calculation. Debugging in parameter design needs to refer to the data being calculated for tuning. In the embodiment of the present disclosure, the first data processor and the second data processor enable the CPU to read out data of calculation results or data in a calculation process, which makes it possible to execute effective parameter design.

In the third example and the fourth example, the second data processor uses the data processor for even-numbered rotation and the data processor for odd-numbered rotation. The readout controller, the readout selection unit, the interrupt timing generator, and a timing to store data in each data processor for even-numbered and odd-numbered rotation with respect to the synchronization data starting from the HP signal in the third example and the fourth example is described later with reference to FIG. 30.

Figure 24:
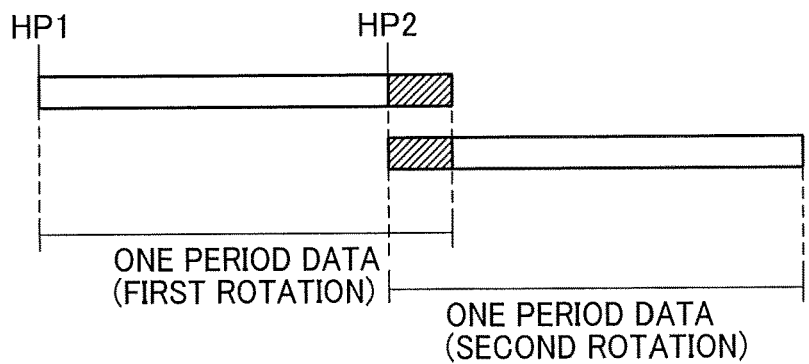
FIG. 24 is an explanatory diagram to describe a case in which a period of HP signals is shorter than a theoretical value in the first embodiment of the present disclosure.

FIG. 24 is an explanatory diagram to describe a case in which a period of HP signals is shorter than a theoretical value in the first embodiment of the present disclosure. The correction calculation unit 508 uses the averaged data and time detected by the HP signals to execute the quadrature detection calculation in each rotation of the rotating body, that is, photoconductor and developing sleeve. The period from the HP position detection to the next HP position detection (the actual time required for one rotation, hereinafter referred to as an actual HP period) does not necessarily agree with the theoretical value due to the periodic fluctuation of the rotating body. The calculation unit may include a circuit configuration which independently executes a calculation of even-numbered rotation and a calculation of odd-numbered rotation. The actual HP period different from the theoretical value has different valid data range. The case in which the HP period is shorter than the theoretical value and the case in which the HP period is longer than the theoretical value is described below.

As illustrated in FIG. 24, when the HP period is shorter than the theoretical value, as the number of data required for calculation, the number of data for one period stored in each buffer illustrated in FIG. 22 is set in advance. When the HP signal at the beginning of the second rotation (hereinafter, referred to as HP2) is detected at a timing before the number of acquired data for one period reaches the set value, the measurement of the second rotation data must be started from the timing when HP2 i s detected. On the other hand, when the number of acquired data for one period does not reaches the set value even after the HP2 is detected, the correction unit 500 continues getting data until the number of acquired data reaches the set value. Therefore, there is a portion overlapping the data of the first rotation and the data of the second rotation, which is a hatched portion in FIG. 24. Even when there is overlapping data, the correction unit 500 acquires a first rotation data and a second rotation data as illustrated in FIG. 24. The number of each of the first rotation data and the second rotation data reaches the set value because the first rotation data and the second rotation data include the overlapping data.

Figure 25:
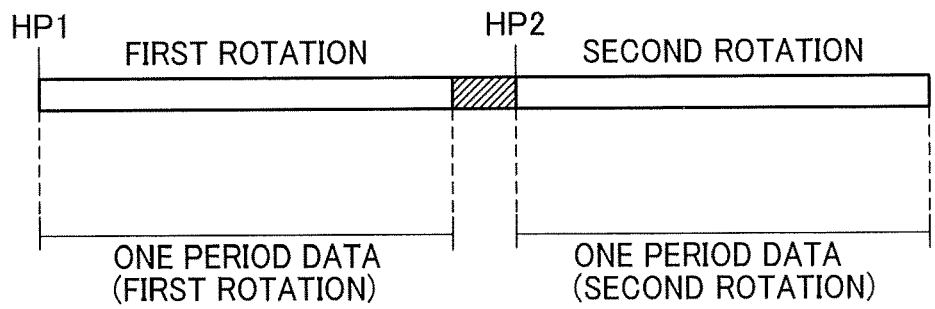
FIG. 25 is an explanatory diagram to describe a case in which the period of HP signals is longer than the theoretical value in the first embodiment of the present disclosure.

FIG. 25 is an explanatory diagram to describe a case in which the actual HP period is longer than the theoretical value in the first embodiment of the present disclosure. As illustrated in FIG. 25, when the HP2 of the second rotation is not detected after the correction unit 500 completes acquisition of the first rotation data, the correction unit 500 continues to acquire excess data until HP2 is detected. The correction unit 500 truncates a data portion (shaded portion) exceeding the number of data for one period.

Figure 26A:
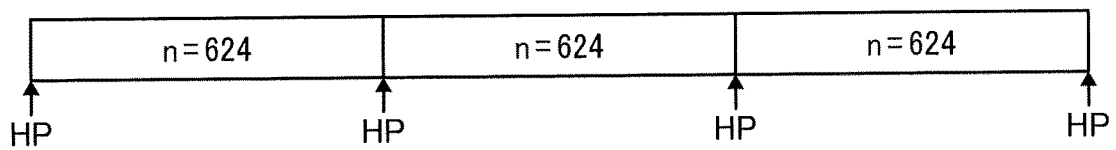
FIG. 26A is an explanatory diagram to describe data sampling in a case in which the period of HP signals is the theoretical value in the first embodiment of the present disclosure.
Figure 26B:
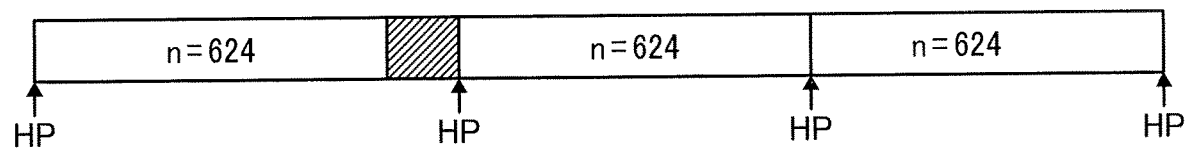
FIG. 26B is an explanatory diagram to describe data sampling in a case in which the period of HP signals is longer than the theoretical value in the first embodiment of the present disclosure.
Figure 26C:
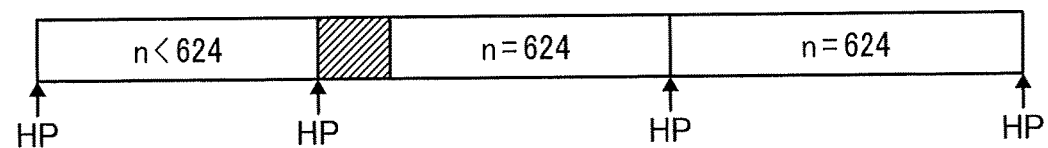
FIG. 26C is an explanatory diagram to describe data sampling in a case in which the period of HP signals is shorter than the theoretical value in the first embodiment of the present disclosure.

FIGS. 26A to 26C are explanatory diagrams to describe cases in which the HP period in the first embodiment of the present disclosure is different from a theoretical period. FIG. 26B illustrates a case in which the HP period later than the theoretical period. FIG. 26C illustrates a case in which the HP period is earlier than the theoretical period. These cases are the cases about the photoconductor, but the concept is similar for the developing sleeve.

FIG. 26A illustrates a case in which the HP period equals the theoretical period. Number of acquired data is 624 per photoconductor rotation period.

FIG. 26 B illustrates a case in which the HP period in the first rotation is longer than the theoretical period and the HP period in the second rotation and the third rotation is the theoretical period. In this case, the correction unit 500 truncates unnecessary data of the first rotation. In this case, total number of data in three rotations becomes "theoretical total number of data in three rotations+number of the truncated unnecessary data in the first rotation"

FIG. 26C illustrates a case in which the HP period in the first rotation is shorter than the theoretical period and the HP period in the second rotation and the third rotation is the theoretical period. In this case, total number of data in three rotations becomes "theoretical total number of data in three rotations−number of the overlapping data in the second rotation and the third rotation".

FIG. 27 is a timing chart to generate an HP enable signal and a start signal (pulse) for identifying the even-numbered rotation and the odd-numbered rotation from the HP signals of the photoconductor in the first embodiment of the present disclosure. The even start signal and odd start signal illustrated in FIG. 27 is a pulse generated by detecting the assertion of the HP signal. The HP enable signal is a signal that becomes High for a preset number of data for each rotation. There are two HP enable signals, that is, an even Hp enable signal and an odd enable signal to set a start point of each signal at a start of even-numbered rotation and odd-numbered rotation, respectively. The HP enable signals are generated based on a preset number, that is, the theoretical number of data for one rotation. Therefore, an enable period of the enable signal may be shorter or longer than that of the HP signal because the period of the HP signal has variation. The rotation period of the developing sleeve is different from the one of the photoconductor rotation, but the signals described above are similarly generated.

Figure 28:
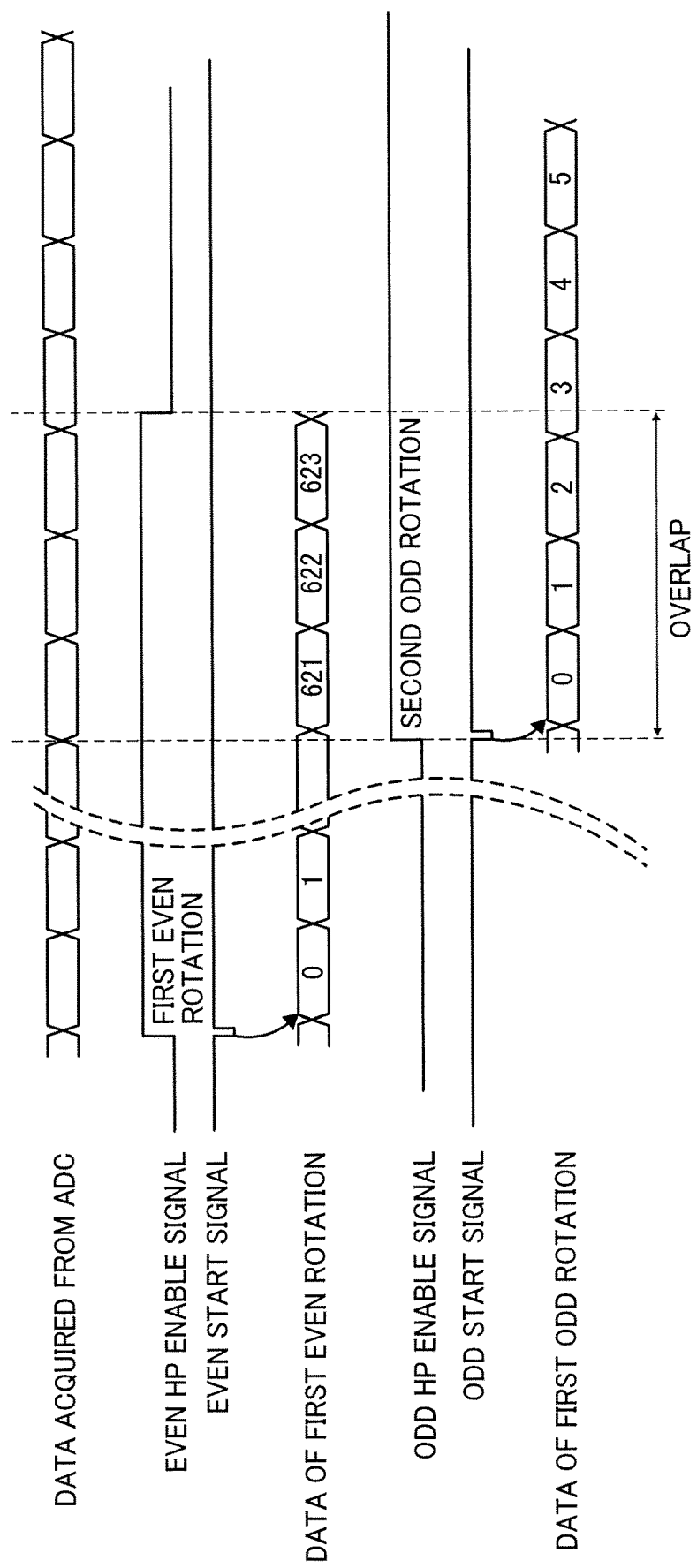
FIG. 28 is a timing chart to describe the data sampling in a case in which the period of HP signals is shorter than the theoretical value in the first embodiment of the present disclosure.

FIG. 28 is a timing chart to describe the data sampling in a case in which the period of HP signals is shorter than the theoretical value in the first embodiment of the present disclosure. In FIG. 28, data acquired from ADC is acquired as data for one period for each of the even-numbered rotation and the odd-numbered rotation. When the even HP enable signal in FIG. 28 is enabled, that is, high, the data acquired from ADC includes data 0, data 1, . . . , data 623 when a number of data is 624.

When the odd HP enable signal is enabled, that is, high, the data acquired from ADC as next rotation data includes data 0, data 1, . . . , data 623 when the number of data is 624. That is, in each of the even-numbered rotation and the odd-numbered rotation, the data acquired from ADC immediately after each of the even start signal and the odd start signal becomes data 0, respectively. Subsequently, until the number of data becomes the predetermined number, the data is acquired from ADC as data of the even-numbered rotation or the odd-numbered rotation. The data of both even-numbered rotation and odd-numbered rotation has an overlapped data as illustrated in FIG. 28.

Figure 29:
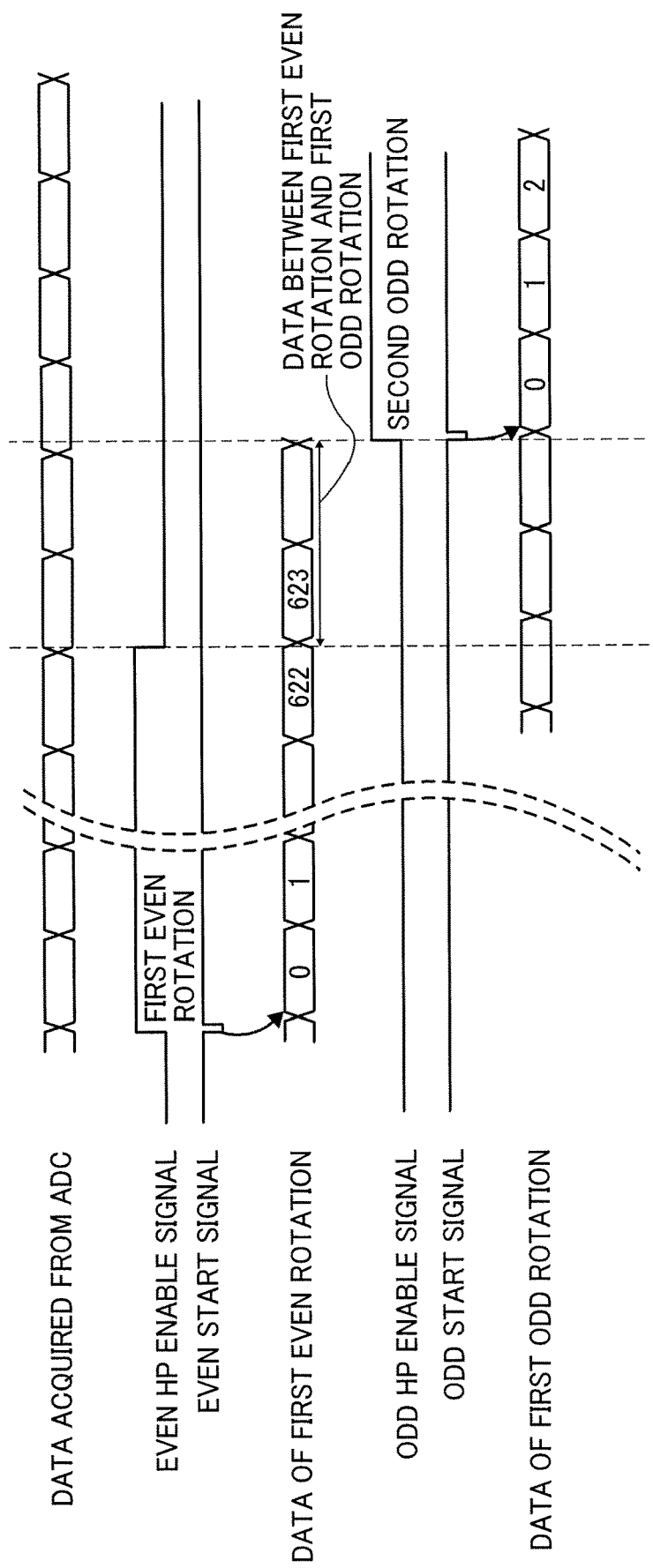
FIG. 29 is a timing chart to describe the data sampling in a case in which the period of HP signals is longer than the theoretical value in the first embodiment of the present disclosure.

FIG. 29 is a timing chart to describe the data sampling in a case in which the period of HP signals is longer than the theoretical value in the first embodiment of the present disclosure. As in the case of acquiring the data illustrated in FIG. 28, the data acquired from ADC immediately after each of the even start signal and the odd start signal becomes data 0, respectively. Subsequently, until the number of data becomes the predetermined number, the data is acquired from ADC as data of the even-numbered rotation or the odd-numbered rotation, and data between the even-numbered rotation and the odd-numbered rotation is discarded.

Figure 30:
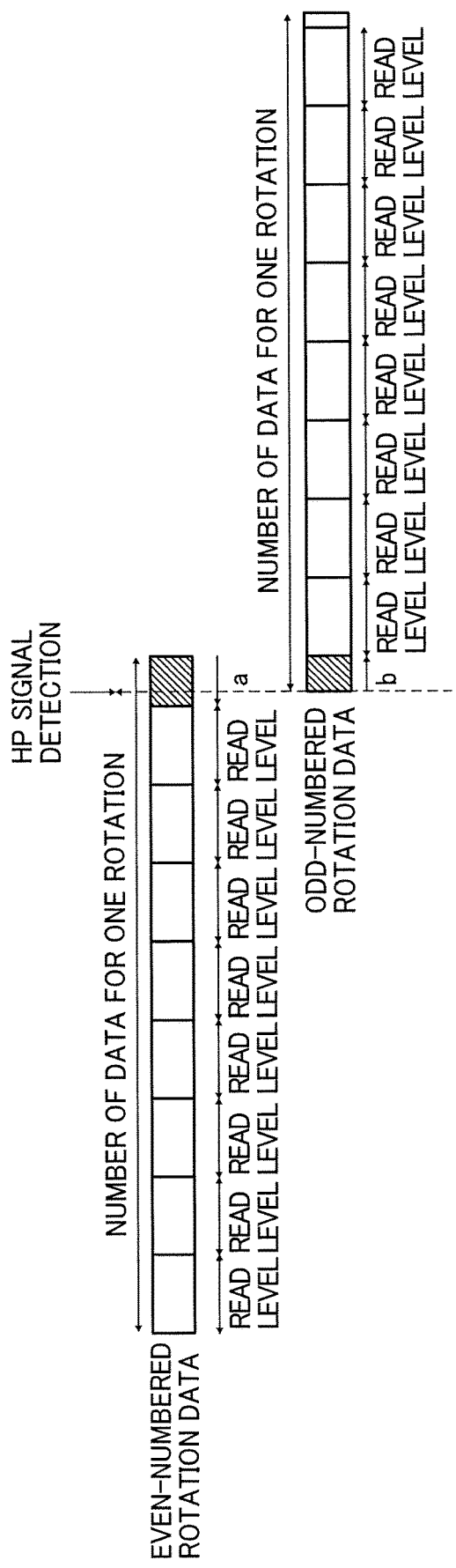
FIG. 30 is an explanatory diagram illustrating a timing to store synchronous data based on the HP signal in each data processor for each numbered rotation.

FIG. 30 is an explanatory diagram illustrating a timing to store synchronous data based on the HP signal in each data processor for each numbered rotation. In the third example and the fourth example which are illustrated in FIG. 23, the second data processor uses the data processor for even-numbered rotation and the data processor for odd-numbered rotation. FIG. 30 illustrates a timing at which the data processor for even-numbered rotation and the data processor for odd-numbered rotation stores the synchronous data starting from the HP signal in the third example and the fourth example. FIG. 30 illustrates acquiring data when acquiring data for even-numbered rotation ends and acquiring data for odd-numbered rotation starts, but acquiring data when acquiring data for odd-numbered rotation ends and acquiring data for even-numbered rotation starts is similar.

As illustrated in FIG. 30, the CPU sets a read level, that is, a number of data in one rotation and a number of data which the CPU reads out and transfers, before starting the correction process, and sets the read level as a fixed value that is not changed during the correction process. Also, the FIFO is mounted for each of even-numbered rotation and odd-numbered rotation, and a size of the FIFO is set to be larger than the number of data in one rotation.

When the number of stored data reaches the read level, the data processor for even-numbered rotation generates a read level interrupt signal. The generated interrupt signal is sent to the CPU via the interrupt control/error processing unit 516 illustrated in FIG. 22. The CPU receives the read level interrupt signal, executes data read to the second data processor, and reads the number of data set the read level. Since the data is sequentially written during this period, the interrupt timing generator illustrated in FIG. 23 generates the interrupt signal when the data remaining amount reaches the read level again, and upon receiving the interrupt signal, the CPU reads data from the second data processor. The above operation is repeated until a number of read data reaches the set number of data in one rotation. It is necessary to control so that the data remaining amount of FIFO as a result of data writing and data reading does not always exceed the capacity of FIFO.

Switching processing from the even-numbered rotation to the odd numbered rotation is described. As described above, the CPU reads data from the second data processor, that is, the data processor for even-numbered rotation or the data processor for odd-numbered rotation based on the read level. However, setting of the number of data in one rotation or the read level may cause a switching timing from one rotation to the next rotation during the data reading as illustrated in a hatched portion in FIG. 30. FIG. 30 illustrates a case in which the HP signal is detected earlier than the ideal timing and the even-numbered rotation data and the odd-numbered rotation data overlap. The second data processor continues to store data until the number of even-numbered rotation data reaches the number of data in one rotation that is a right end of "a" in FIG. 30. On the other hand, the second data processor starts data storage for odd-numbered rotation data after HP signal detection.

The interrupt timing generator of the second data processor illustrated in FIG. 23 generates the interrupt signal at a timing when the sum of a number of data for even-numbered rotation and a number of data for odd-numbered rotation reaches the read level, that is, a+b=a number of read level.

The readout controller of the second data processor illustrated in FIG. 23 counts total number of data in the data processor for even-numbered rotation read by the CPU and outputs a selection signal for data for even-numbered rotation to the readout selection unit of the second data processor illustrated in FIG. 23 until the total number of data reaches the predetermined number of data for one rotation, that is, the right end of "a" illustrated in FIG. 30. The readout selection unit receives data read from the CPU due to the interrupt signal and outputs the data for even-numbered rotation.

On the other hand, the readout controller outputs a selection signal for data for odd-numbered rotation to the readout selection unit, and the readout selection unit receives data read from the CPU due to the interrupt signal and outputs the data for odd-numbered rotation following the data for even-numbered rotation as illustrated "b" in FIG. 30.

A mode selection register is provided in the CPU IF unit 517 of the correction unit 500 connected to the CPU illustrated in FIG. 22 via the bus. The mode selection register inputs a mode selection signal for setting whether the quadrature detection is to be performed or not to the correction calculation unit 508 and the data input unit 501.

When the quadrature detection is performed, the HP signal becomes a start signal, data is acquired in each rotating body, acquired data is processed in each of the even-numbered rotation and the odd-numbered rotation, and results are stored in the first data processor.

When the quadrature detection is not performed (that is, the process control is performed), the HP signal is not used but stored in the second data processor using the path of the buffer for photoconductor even data 504 illustrated in FIG. 22.

Therefore, this system can handle both correction accompanied by quadrature detection and process control not involving quadrature detection.

Figure 31A:
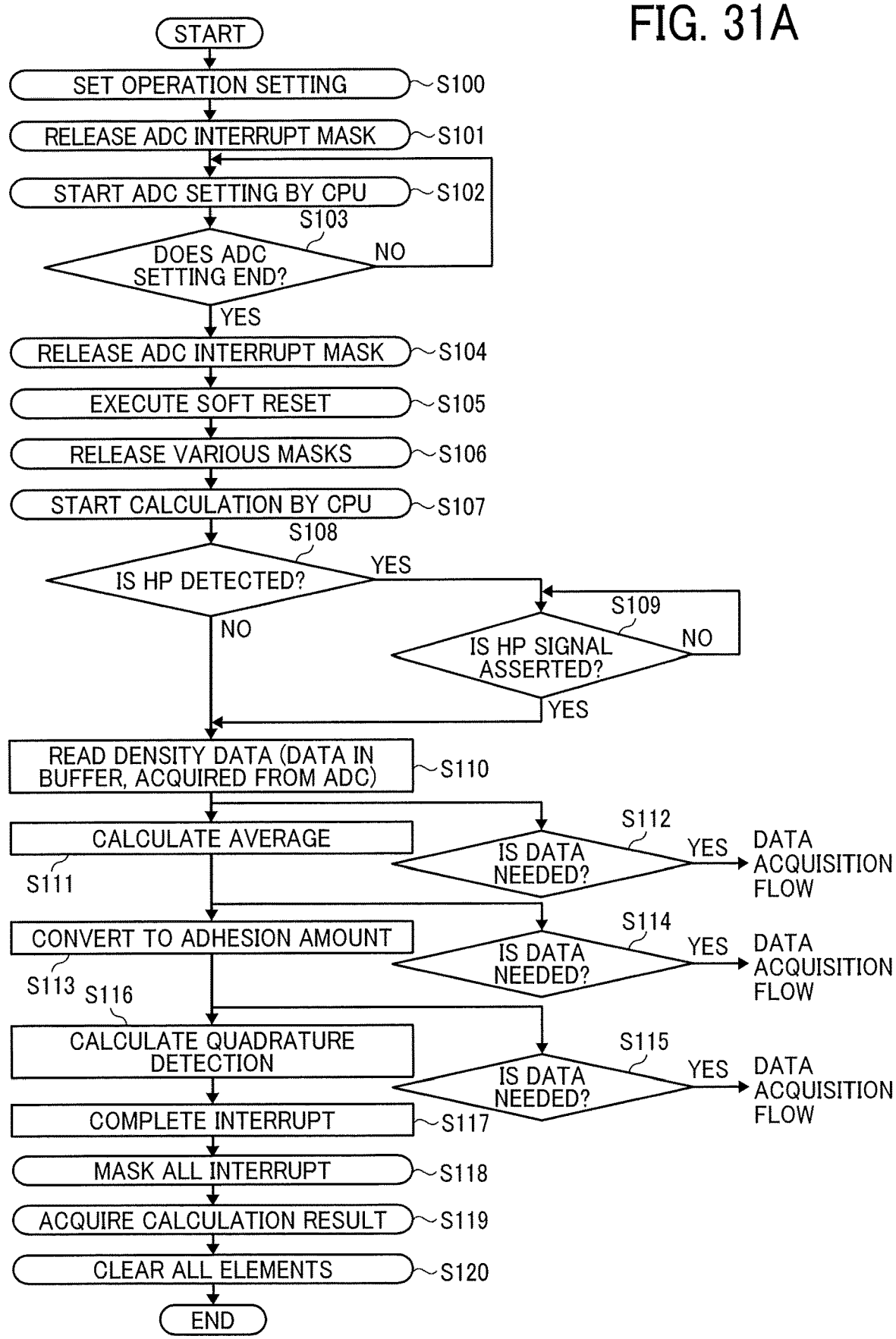
FIGS. 31A and 31B are flowcharts illustrating a correction process in the first embodiment of the present disclosure.
Figure 31B:
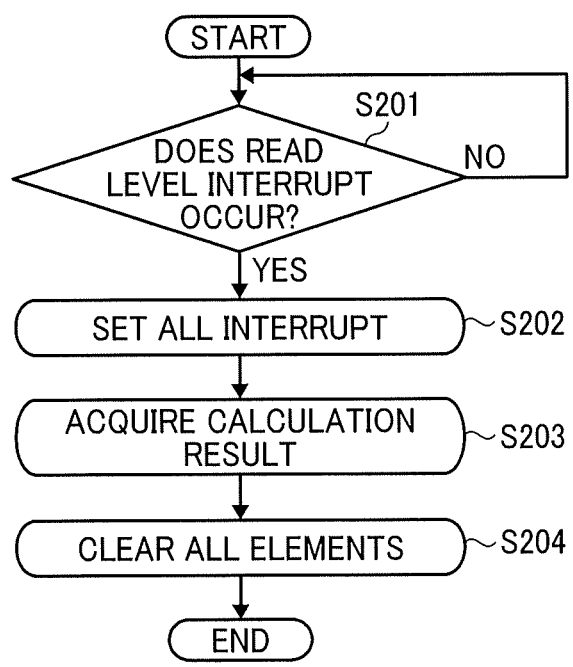

FIGS. 31A and 31B are flowcharts illustrating correction processing in the first embodiment of the present disclosure.

In step S100, the CPU sets necessary operation modes, ADC, density sensor setting, operating parameters, and the like as operation settings for the correction unit 500. Subsequently, the CPU releases the ADC interrupt mask (S101), performs the setting of the transfer mode and the like of the ADC (S102), and, when the setting of the ADC is completed (YES of S103), proceeds to the step S105. When the setting of the ADC is not completed (No in step S103), the process returns to step S102 to set the ADC.

Subsequently, the CPU releases the ADC interrupt mask (S104), executes soft reset to initialize a circuit (S105) and release various masks (S106), and then starts calculation (S107). After the CPU determines whether the HP signal is detected (YES in step S108 or NO in step S108), The CPU reads the image density data from the ADC (S110), calculates an average (S111), and converts to an adhesion amount (S113). If there is a necessary data such as buffer data (YES in step S112), average (YES in step S114), and converted adhesion amount (YES in step S115), the CPU proceeds to data acquisition flow. After the adhesion amount conversion, the quadrature detection is performed in step S116, and a completion interrupt is issued in step S117. Subsequently, the CPU masks all interrupts in step S118, reads and acquires the calculation result from the second data processor in step S119, clears all elements in step S120, and ends the flow.

After start of the data acquisition flow, the CPU waits until the read level interrupt occurs (No in step S201). After the read level interrupt occurs (Yes in step S201), the CPU masks all interrupts in step S202, reads and acquires calculation results from the second data processor, and clears all elements in step S204. When the determination result is No in the determination step S112, the CPU proceeds step S111. When the determination result is No in the determination step S114, the CPU proceeds step S113. When the determination result is No in the determination step S115, the CPU proceeds step S116. Setting and order of each item of the above flow is an example, and the setting and order are not unique from the purpose of executing the calculation.

As described above, in the first embodiment of the present disclosure, when the CPU of the image forming apparatus 1 reads and stores the data from the image density sensor 181, the CPU reads and stores the predetermined number of data in one rotation in each of the even-numbered rotation and the odd-numbered rotation independently. Therefore, in the image forming apparatus 1, even when the eccentricity or the like of the rotating body such as the photoconductor and the developing sleeve causes the fluctuation, even when the period in one rotation is longer or shorter than the theoretical period, the CPU can acquire the ideal number of data for even-numbered rotation and odd-numbered rotation based on the preset ideal number of data in one rotation and the actual rotation data read by interruption based on the home position signal.

That is, when the CPU reads and stores the image density sensor data relating to the image density correction processing, even if there is a periodic deviation due to eccentricity or the like of the rotating body such as a photoconductor or the like, the CPU can read and store the data of the ideal number of image density data in one rotation and implement image density correction processing that is not affected by the periodic deviation.

Further, in the image forming apparatus 1 according to the first embodiment of the present disclosure, the second data processor stores data usable for correction processing other than the image density fluctuation correction occurring in the intermediate stage of the calculation in the correction calculation unit 508 and outputs it to the CPU. Therefore, the CPU can execute other correction processing concurrently with the image density fluctuation correction.

The second embodiment in the present disclosure is described below. The description mentioned below is focused on differences between the first embodiment and the second embodiment. Therefore, points not specifically mentioned may be the same as in the first embodiment.

Figure 32:
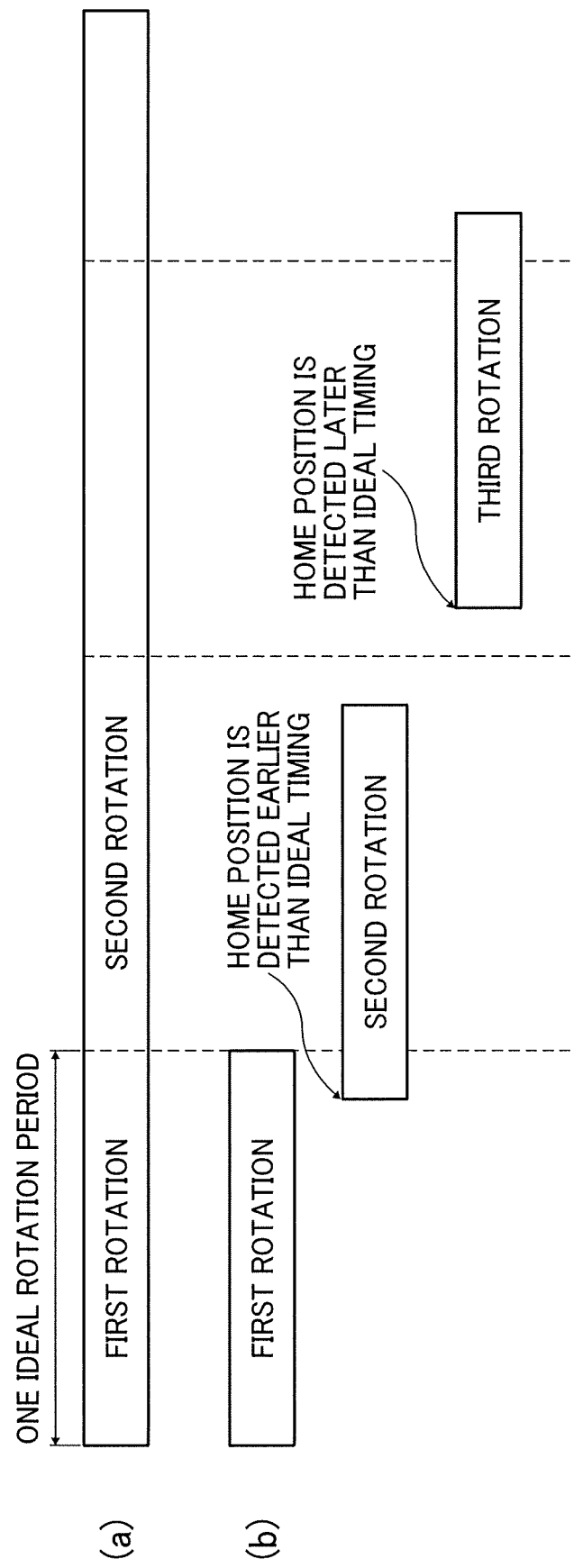
FIG. 32 is an explanatory diagram illustrating difference in data required in a correction calculation in a second embodiment of the present disclosure.

FIG. 32 is an explanatory diagram illustrating difference in data required in a correction calculation in the second embodiment of the present disclosure.

As described above, in the process of correcting the image density fluctuation, the controller 110 reads the output of the image density sensor that has detected the toner image for detection of the image density fluctuation at a predetermined cycle and acquires image density fluctuation waveform data for plural cycles and performs averaging process for the image density fluctuation waveform data. The averaging process requires the image density data whose number is determined by a sampling period and a rotational speed of the photoconductor or the developing sleeve, the image density data having a rotation home position of the photoconductor or developing sleeve as a start position.

The eccentricity of the photoconductor and the developing sleeve may change one rotation period longer or shorter than the ideal period. FIG. 32 illustrates the deviation of the start position of the data used for the correction calculation. The square frame illustrated in FIG. 32 means the toner image for detection of the image density fluctuation. A case in which the photoconductor has no eccentricity and rotates at the ideal rotation period is illustrated in (a) of FIG. 32. The ideal rotation period means that a completion timing of acquisition of the sampling data necessary for the averaging process in one rotation period is the same as the rotation home position detection timing for the next rotation.

The eccentricity of the photoconductor sometimes causes detection timing of the rotation home position to be advanced or delayed. An example in which the detection timing of the rotation home position is earlier or later than the ideal timing is illustrated in (b) of FIG. 32. The actual toner image for detection of the image density fluctuation in (b) of FIG. 32 is the same as the one in (a) of FIG. 32, but, to clearly indicate the deviation of the sampling reference position, for the sake of convenience, the square frames corresponding to the toner images for detection of the image density fluctuation of the first to third rotation are divided and illustrated. When the rotation home position is detected earlier than the ideal timing, the sampling data at the end of the first rotation is also used for the correction operation for the second rotation. When the rotation home position is detected later than the ideal timing, the data after detection of the rotation home position is used for the correction calculation, and the data before the rotation home position detection is ignored. The above embodiment relates to the photoconductor, but the same applies to the developing sleeve.

Without using the method of the present disclosure, since the eccentricity affects data necessary for the correction calculation, the CPU needs to save all sampled data of the toner image for detection of the image density fluctuation to correct the image density fluctuation, separately acquire the rotation home position data of the photoconductor or the developing sleeve, associate the all sampled data of the toner image with the rotation home position data, and extract the data of the toner image for every rotations. Since the correction calculation requires data for a plurality of rotations, the above-mentioned method increases the total number of data necessary for the correction calculation and requires a large memory capacity. To improve the productivity of the image forming apparatus 1, in place of the correction operation of the image density fluctuation correction processing by the software, a correction calculation may be executed on hardware in which a field-programmable gate array (FPGA) or the like is mounted in a circuit. The price of electronic components such as FPGAs is greatly affected by the capacity of the logic cell and RAM. Using the above method increases memory capacity and increases FPGA cost.

Figure 33:
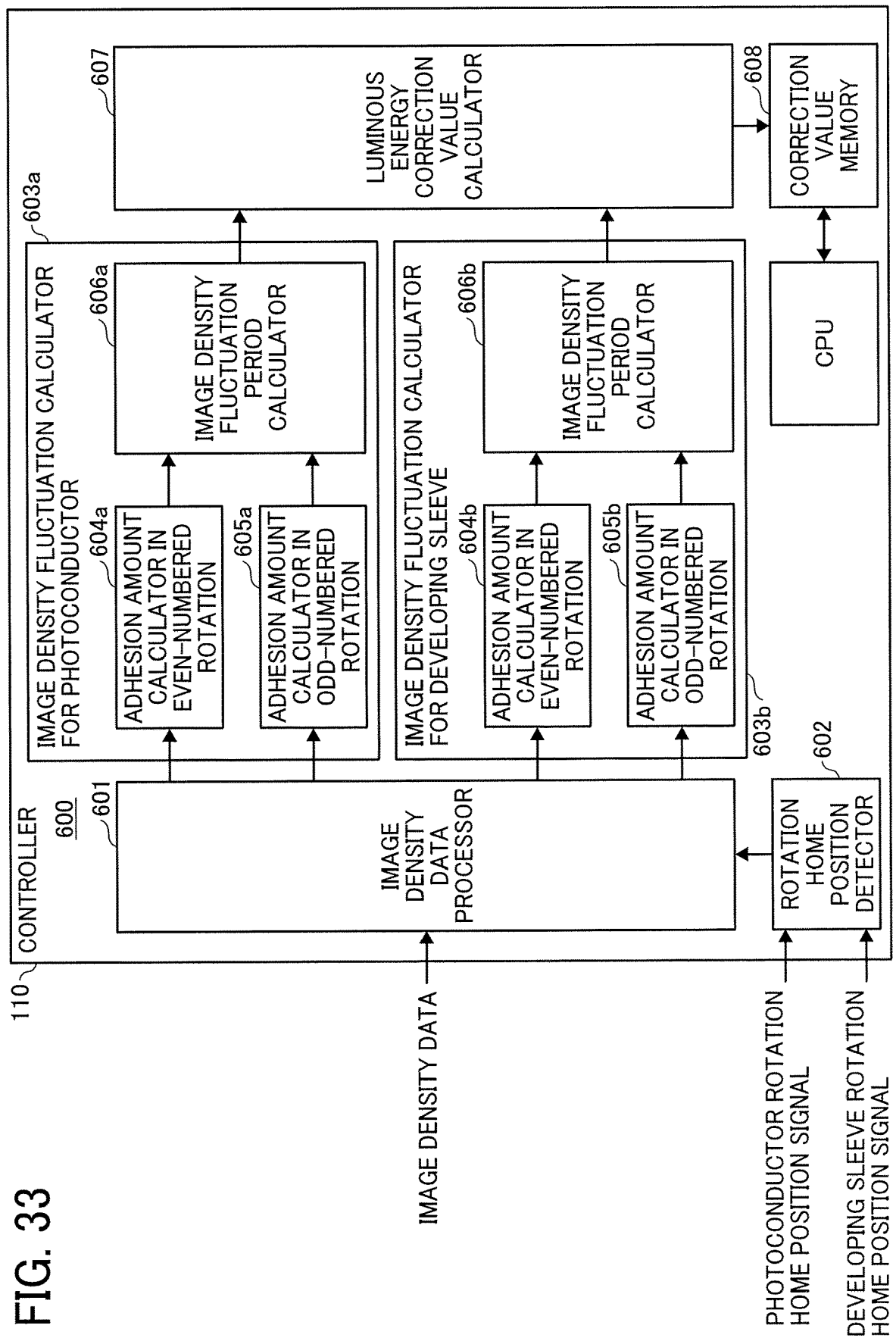
FIG. 33 is a schematic diagram illustrating an example of a configuration of a correction calculation circuit in a controller to correct the image density fluctuation in the second embodiment of the present disclosure.

FIG. 33 is a schematic diagram illustrating an example of a configuration of a correction calculation circuit 600 in the controller 110 to correct the image density fluctuation in the second embodiment of the present disclosure. The correction calculation circuit 600 to correct the image density fluctuation is included in the controller 110. The correction calculation circuit includes an image density data processor 601, a rotation home position detector 602, an image density fluctuation calculator for the photoconductor 603a, an image density fluctuation calculator for the developing sleeve 603b, a luminous energy correction value calculator 607, and a correction value memory 608. The image density fluctuation calculator for the photoconductor 603a includes an adhesion amount calculator in even-numbered rotation 604a, an adhesion amount calculator in odd-numbered rotation 605a, and an image density fluctuation period calculator 606a. The image density fluctuation calculator for the developing sleeve 603b includes an adhesion amount calculator in even-numbered rotation 604b, an adhesion amount calculator in odd-numbered rotation 605b, and an image density fluctuation period calculator 606b. Hereinafter, when it is unnecessary to distinguish between the calculator for the photoconductor and the calculator for the developing sleeve, the above-described calculator is described as the image density fluctuation calculator 603, the adhesion amount calculator in even-numbered rotation 604, the adhesion amount calculator in odd-numbered rotation 605, and the image density fluctuation period calculator 606.

The rotation home position detector 602 receives the rotation home position signals (the voltage values from each sensor) from the photoconductor rotation sensor 76 and the sleeve rotation sensor 183. The rotation home position detector 602 detects the rotation home position of each rotating body based on the change in the voltage values in the received rotation home position signals and notifies the timing when each rotating body reaches the rotation home position to the image density data processor 601. Since the rotation home position signals (the voltage values from each sensor) received by the rotation home position detector 602 may temporarily change the voltage value due to the influence of noise, the rotation home position detector 602 monitors the rotation home position signals at a plurality of times at a period shorter than the sampling period of the image density data processor 601, and when a change in the voltage value occurs, the rotation home position detector 602 confirms the rotation home position by measuring the same voltage value at plural times. When the same voltage value is continuously measured a plurality of times, the rotation home position detector 602 determines that the rotating body is at the rotation home position.

The image density data processor 601 starts acquiring the image density data from the image density sensor 181 at an arbitrary sampling period from the timing when the image density data processor 601 receives the notification of the rotation home position detection of each rotating body from the rotation home position detector 602 and outputs the image density data to the adhesion amount calculators 604a, 605a, 604b, and 605b.

In the latter part of the image density data processor 601, there are two image density fluctuation calculators, that is, the image density fluctuation calculator for the photoconductor 603a and the image density fluctuation calculator for the developing sleeve 603b as calculation circuits to calculate the image density fluctuation periods and the image density fluctuation waveforms, which independently calculate the image density fluctuation period and waveform for the photoconductor and the image density fluctuation period and waveform for the developing sleeve. Each of the calculation circuits includes the adhesion amount calculators 604/605 and the image density fluctuation period calculator 606, and the adhesion amount calculators 604/605 receive the image density data, calculate the toner adhesion amount, and output the adhesion toner amount to the image density fluctuation period calculator 606. The image density fluctuation period calculator 606 receives the adhesion toner amount data of the toner image for detection of the image density fluctuation and extracts the image density fluctuation period and the image density fluctuation waveform of the toner image for detection of the image density fluctuation. As an extraction method, for example, the quadrature detection or Fast Fourier Transform (FFT) and the like can be used. In the present embodiment, the image density fluctuation period calculator 606 performs the quadrature detection. Incidentally, the adhesion amount calculator of the calculation circuit includes the adhesion amount calculator in odd-numbered rotation 605 and the adhesion amount calculator in even-numbered rotation 604 for each rotating body and independently calculates data for one rotation period in the odd-numbered rotation and the even-numbered rotation for each rotating body. The image density data processor 601 determines switching between the odd-numbered rotation and the even-numbered rotation based on the notification of the rotation home position detection received from the rotation home position detector 602 as a trigger, and switches an output to the adhesion amount calculators 604/605.

For example, when detecting the rotation home position of the photoconductor, the image density data processor 601 starts outputting the image density data received from the image density sensor to the adhesion amount calculator in odd-numbered rotation 605a and continues outputting the image density data for one rotation period which needs the image density fluctuation correction. Similarly, when detecting the next rotation home position, the image density data processor 601 outputs the image density data to the adhesion amount calculator in even-numbered rotation. If the rotation home position is detected earlier than the ideal timing due to the eccentricity of the photoconductor, the image density data processor 601 outputs the image density data for the odd-numbered rotation and the even-numbered rotation in parallel.

With reference to FIG. 32 the present embodiment is described. The image density data processor 601 detects the first rotation home position and outputs the image density data for the first rotation to the adhesion amount calculator in odd-numbered rotation 605a. Since the rotation home position signal is received earlier than the ideal timing in the second rotation, the image density data processor 601 keeps outputting the image density data for the first rotation to the adhesion amount calculator in odd-numbered rotation 605a and outputs the same image density data as the image density data for the second rotation to the adhesion amount calculator in even-numbered rotation 604a. That is, in the overlapping portion between the first rotation and the second rotation, the same image density data is outputted in parallel to the adhesion amount calculator in even-numbered rotation 604a and the adhesion amount calculator in odd-numbered rotation 605a. When the image density data processor 601 completes outputting a predetermined number of image density data for the first rotation and the second rotation, the image density data processor 601 temporarily stops outputting the image density data to the adhesion amount calculators 604a and 605a. After that, the image density data processor 601 receives the rotation home position signal of the third rotation later than the ideal timing. Upon detecting the rotation home position of the third rotation, the image density data processor 601 starts outputting the image density data to the adhesion amount calculator in odd-numbered rotation 605a and outputs the image density data for one rotation.

As described above, acquisition of the image density data for each rotation from the rotation home position in each of the calculation circuits for even-numbered rotation and odd-numbered rotation enables the image density data processor 601 to extract only necessary data for the calculation for each rotation, and the image density processing does not need acquisition of all image density data for each rotation, associating the acquired image density data with the rotation home position data, and extracting the necessary data, which enables to reduce the memory capacity.

The luminous energy correction value calculator 607 calculates a correction value for adjusting the luminous energy of optical writing for the latent image of each rotating body based on the periodic characteristics of the image density fluctuation extracted by the image density fluctuation period calculator 606 and stores the correction value in the correction value memory 608.

The interrupt notification signal from the luminous energy correction value calculator 607 notifies the CPU of the calculation completion of the luminous energy correction value, and the CPU acquires the luminous energy correction value from the correction value memory 608. In addition, the CPU sets the acquired luminous energy correction value in the laser writing device 21. Above described control changes the luminous energy of optical writing for the latent image periodically, which reduces the residual cyclic fluctuation.

The correction value memory 608 may not only store the final calculation result but also store an intermediate value during the calculation. For example, the correction value memory 608 may store the calculation result of the adhesion amount calculators 604 and 605, the calculation result of the image density fluctuation period calculation result, or the like so that the calculation data and the intermediate value can be used in another correction processing.

Figure 34:
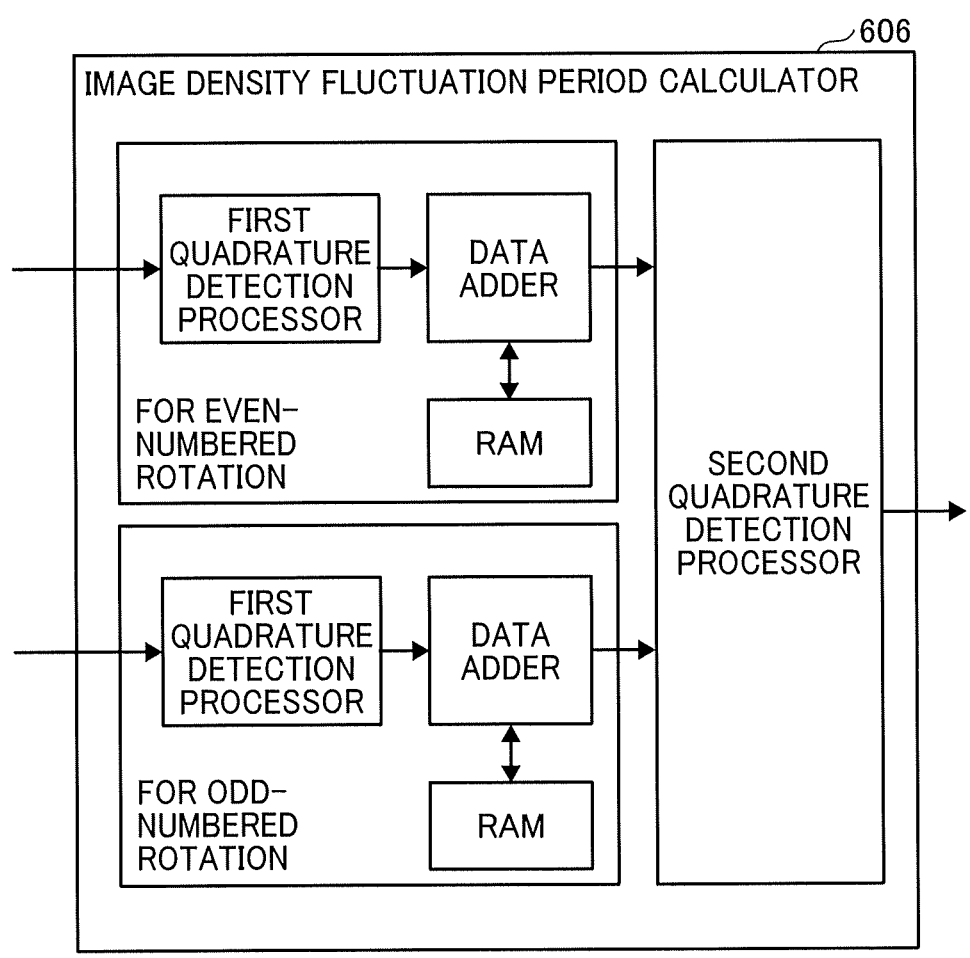
FIG. 34 is a schematic diagram illustrating a configuration example of an image density fluctuation period calculator according to the second embodiment of the present disclosure.

FIG. 34 is a schematic diagram illustrating a configuration example of an image density fluctuation period calculator 606 according to the second embodiment of the present disclosure. The image density fluctuation period calculator 606 includes calculation circuits for odd-numbered rotation calculation and even-numbered rotation calculation.

A first quadrature detection processor receives toner adhesion amount data from the adhesion amount calculators and performs pre-processing of the quadrature detection. The waveform of the image density data including the residual cyclic fluctuation is expressed by the superimposition of sine waves periodically varying at a frequency that is an integral multiple of the rotation frequency of the photoconductor or the developing sleeve.

$\Sigma A_i \times \sin(i \times \omega t \times \theta i)$ i=natural number of 1 to x
$A_i$: amplitude of sine wave
$\omega$: Angular speed of the developing sleeve or the photoconductor
$\theta i$: phase of the sine wave The first quadrature detection processor calculates, at any time, the product of the toner adhesion amount data acquired at predetermined sampling intervals and the sinusoidal wave at each sampling time increased from t=0 that is the timing when the rotation home position signal is detected by sampling time and outputs calculation results to a data adder. To accurately correct the image density fluctuation, it is desirable for the sine wave to include a high-frequency component obtained by multiplying the angular velocity of the photoconductor and the developing sleeve by an integer. Therefore, the first quadrature detection processor of this embodiment executes calculation including the first-order to the third-order angular velocity.

The data adder sequentially adds the data received from the first quadrature detection processor and stores it in the RAM. The addition method is described later. The data adder counts the number of data stored in the RAM, and when the number of data necessary for the calculation is stored in the RAM, the data adder notifies the second quadrature detection processor that data output is prepared. If the data output is allowed, the data adder reads out data from the RAM and outputs the data.

The second quadrature detection processor alternately receives data from a calculation circuit for odd-numbered rotation and a calculation circuit for even-numbered rotation after receiving a notification of the data output preparation completion from the calculation circuits, merges the data for odd-numbered rotation and even-numbered rotation, executes post-processing operation of the quadrature detection to calculate $A_i$ and $\theta i$, and calculates the image density fluctuation components for each frequency. The second quadrature detection processor outputs calculation results to the luminous energy correction value calculator 607. The above control and processing are executed for both the photoconductor and the developing sleeve.

Figure 35:
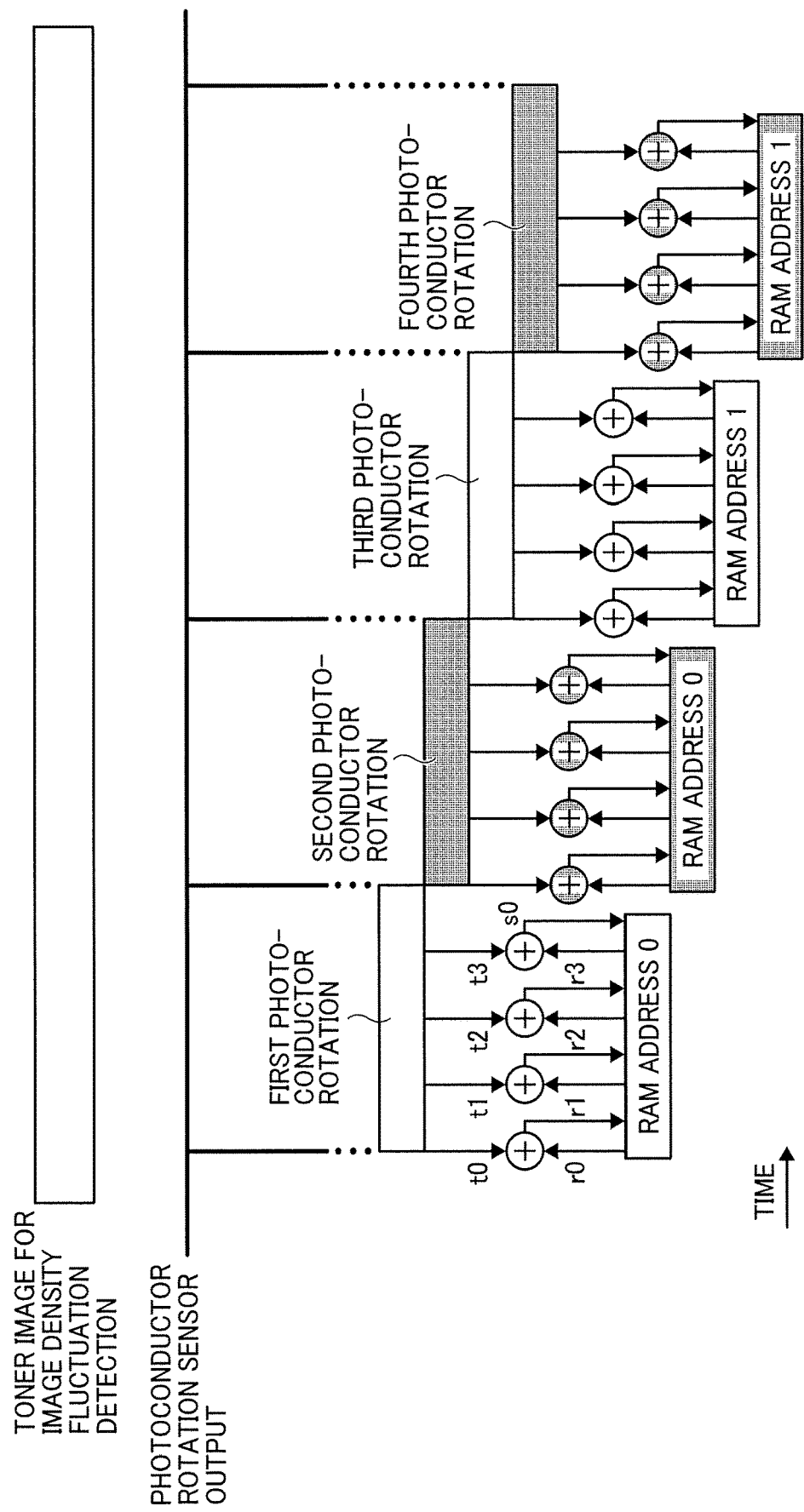
FIG. 35 is an explanatory diagram to describe an addition operation of a data adder unit in the second embodiment of the present disclosure.

FIG. 35 is an explanatory diagram to describe addition processing of the data adder in the second embodiment of the present disclosure. The horizontal direction in FIG. 35 represents time.

The data adder performs the addition processing of $\Sigma$ in the quadrature detection arithmetic expression $\Sigma A_i \times \sin(i \times \omega t + \theta i)$. As described above, in the present embodiment, quadrature detection is performed with angular velocities from the first-order to the third-order. In the following description, the first-order calculation is described as an example.

The data adder receives the toner adhesion amount data at an arbitrary time interval determined by the sampling interval from the first quadrature detection processor (t0, t1, t2, t3).

The data adder acquires the data (r0, r1, r2, r3) from an arbitrary address (address 0) of the RAM every time when the data adder receives the toner adhesion amount data and adds the data to the toner adhesion amount data. In this example, the data r0 read form the RAM firstly is 0. The added result is written again to the same address in the RAM. The above control is repeated every time when the toner adhesion amount data is received. That is, sequential repeat of reading the data from the RAM and adding the read data to the toner adhesion amount data like t0+r0=r1, t1+r1=r2, t2+r2=r3, t3+r3=s0 gives the final stored data s0 at the RAM address 0 serving as one memory address. The final stored data s0 is a value obtained by adding data for one period of the photoconductor.

The data adder executes the above-described addition processing for each period of the photoconductor. The address of the RAM in which the addition result is written is changed each time the addition processing for one rotation is completed. In FIG. 35, the address of the RAM is changed from the address 0 to the address 1.

As described above, because the calculation circuit for odd-numbered rotation is different from the calculation circuit for even-numbered rotation, the calculation circuit for odd-numbered rotation calculates data in the first rotation and the third rotation which are illustrated as two white squares in FIG. 35, and the calculation circuit for even-numbered rotation calculates data in the second rotation and the fourth rotation which are illustrated as hatched squares in FIG. 35. Therefore, even when the eccentricity of the photoconductor changes the rotation home position from the ideal position, especially, even when the rotation home position signal earlier than the ideal timing causes the overlap of the necessary data in each rotation, the two calculation circuits can independently execute the calculation.

According to the above method, the RAM does not need to store all data received from the first quadrature detection processor, that is, t0, t1, . . . The RAM may have an area capable of storing the addition result for each rotation calculated every time when the first quadrature detection processor receives data. Therefore, the memory capacity can be reduced. The above description is an example of the photoconductor, but the same applies to the developing sleeve.

Figure 36:
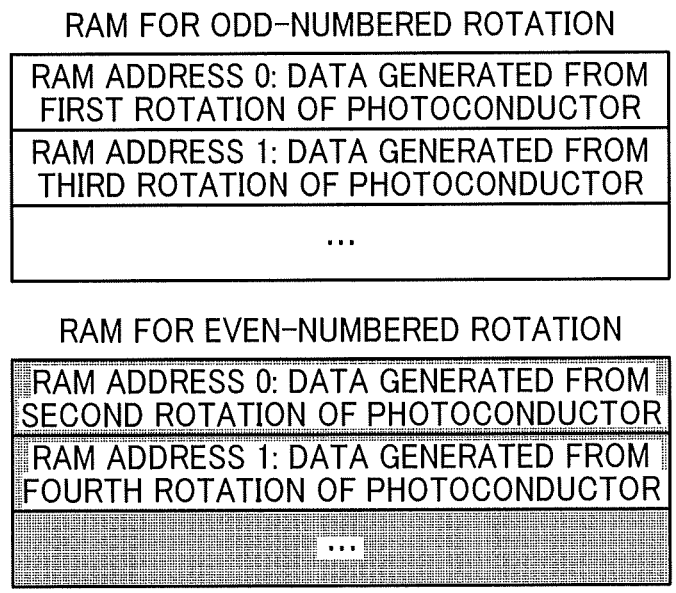
FIG. 36 is an explanatory diagram to describe a relation between an address and data stored in a RAM according to the second embodiment of the present disclosure.

FIG. 36 is an explanatory diagram to describe a relation between the address and data stored in the RAM according to a second embodiment of the present disclosure.

When all the data required for the image density fluctuation correction calculation has been acquired, only the addition result of one rotation is stored in each address of the RAM for the odd-numbered rotation and the even-numbered rotation. Since the luminous energy correction value calculator 607 can acquire data in an arbitrary order from the data adder, the luminous energy correction value calculator 607 acquires only the addition result of the data in rotation necessary for the correction calculation and calculates the final correction value. For example, when the luminous energy correction value calculator 607 executes the correction calculation using the data of the first to third rotation of the photoconductor, the luminous energy correction value calculator 607 may access the address 0 in the RAM for odd-numbered rotation, the address 0 in the RAM for even-numbered rotation, and the address 1 in the RAM for odd-numbered rotation in this order. When the luminous energy correction value calculator 607 executes the correction calculation using the data of the second to fourth rotation of the photoconductor, the luminous energy correction value calculator 607 may access the address 0 in the RAM for even-numbered rotation, the address 1 in the RAM for odd-numbered rotation, and the address 1 in the RAM for even-numbered rotation in this order. The above description is an example of the photoconductor, but the same applies to the developing sleeve.

Figure 37:
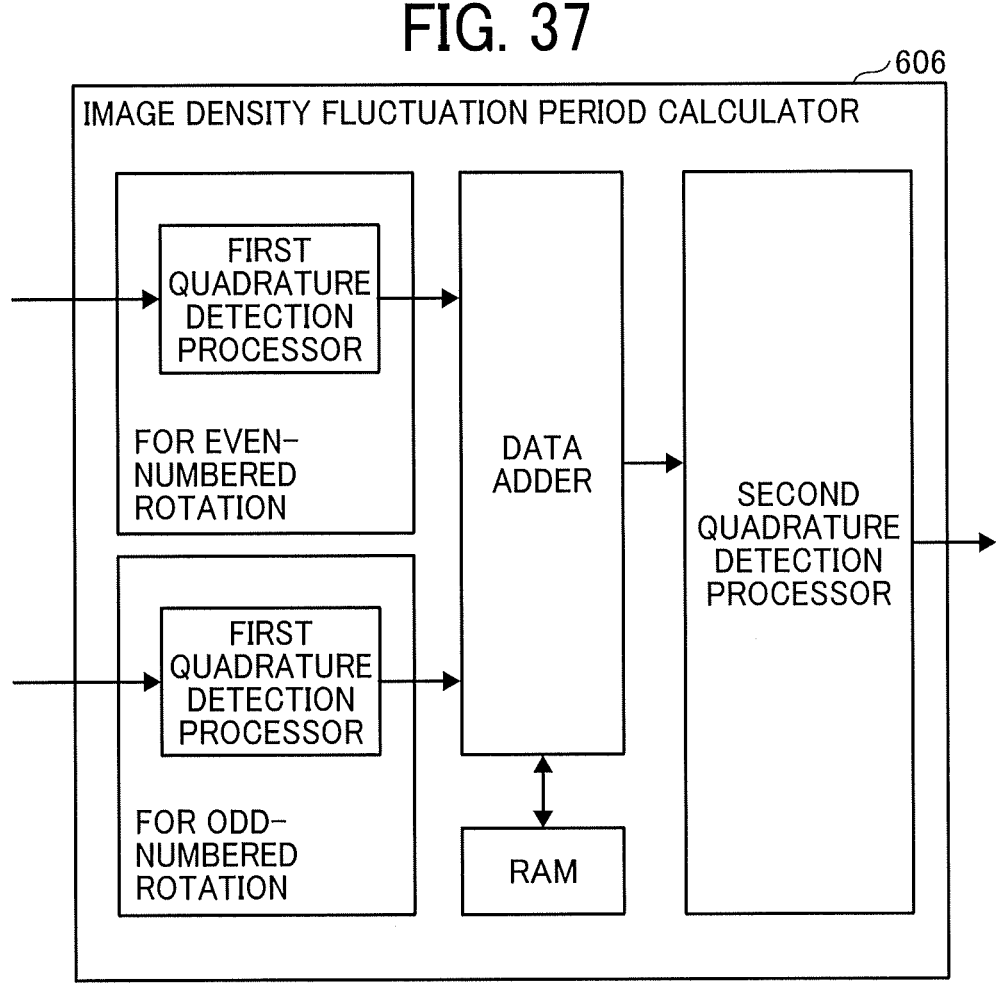
FIG. 37 is a schematic diagram illustrating another configuration example of an image density fluctuation period calculator according to the second embodiment of the present disclosure.

FIG. 37 is a schematic diagram illustrating another configuration example of an image density fluctuation period calculator 606 according to the second embodiment of the present disclosure. FIG. 34 illustrates the configuration having the first quadrature detection processor and the data adder for even-numbered rotation and the first quadrature detection processor and the data adder for odd-numbered rotation separately. However, if the computation time for two addition process is sufficiently earlier than the time interval (sampling interval) for performing addition processing, because the addition processing in even-numbered rotation and the addition processing in odd-numbered rotation completes in the time interval (sampling interval) for performing addition processing even in the case of overlap between even and odd rotations, the image density fluctuation calculator 606 does not need to have the data adder and the RAM for even-numbered rotation and odd-numbered rotation and may share the data adder and the RAM, which reduces the circuit scale. In this configuration, the image density fluctuation calculator 606 sets the RAM address accessed at the addition processing to be incremented in each rotation, which is convenient because the data of addition processing in the odd-numbered rotation and the even-numbered rotation is merged in order from the address 0.

In the case in which there is no overlap between the even-numbered rotation and the odd-numbered rotation, the image density fluctuation calculator may perform the addition processing illustrated in FIG. 35. In the case in which there is overlap between the even-numbered rotation and the odd-numbered rotation, the data adder receives the data for even-numbered rotation and the data for odd-numbered rotation at the same timing. The data adder separately manages the RAM access address for even-numbered rotation and the RAM access address for odd-numbered rotation and carries out the addition processing in uniquely determined order. In the present embodiment, an initial RAM access address is set 0 for the odd-numbered rotation and 1 for the even-numbered rotation.

For example, In the case in which there is overlap between the even-numbered rotation and the odd-numbered rotation, the data adder initially acquires the data for the odd-numbered rotation, refers to the RAM access address for the odd-numbered rotation, and executes the addition processing. When the data adder completes the addition processing for the odd-numbered rotation, the RAM access address for the odd-numbered rotation is incremented by +2. After the data adder completes the addition processing for the odd-numbered rotation, the data adder acquires the data for the even-numbered rotation subsequently, refers to the RAM access address for the even-numbered rotation, and executes the addition processing. When the data adder completes the addition processing for the even-numbered rotation, the RAM access address for the even-numbered rotation is incremented by +2. Repeating the above processing until the number of the data reaches the number necessary for the correction operation, that is, until the data acquisition completion timing, brings about the state in which the data for odd-numbered rotation and the data for even-numbered rotation are alternately stored from the address 0, that is, the state in which the data is continuous on the time axis. The present configuration enables one RAM to handle the data of the addition processing for all rotations and simplifies the data acquisition control of the second quadrature detection processor in the subsequent stage.

As described above, the second embodiment of the present disclosure is configured to acquire the sampling data for the even-numbered rotation and the odd-numbered rotation independently when the data of the rotating body such as the photoconductor and the developing sleeve is sampled. At the time of executing the averaging process of the correction calculation, the data adder acquires the previous addition result from the RAM at the timing when new sampling data is acquired, adds the new sampling data with the previous addition result, stores the new addition result in the RAM, and repeats these processes. At last, the addition result is divided by the total number of data. Sampling the data for even-numbered rotation and the data for odd-numbered rotation independently enables the averaging processing without associating the rotation home position data with the sampling data and storing all necessary data for the calculation in the RAM. Therefore, in the technique of reducing periodic fluctuation of the image density, the memory capacity required for the correction value calculation is reduced.

In the embodiment of the present disclosure, the photoconductor or the developing sleeve is an example of the rotating body. The photoconductor rotation sensor 182 or the sleeve rotation sensor 183 is an example of a detection unit. The data input unit 501 is an example of an acquisition unit. The correction calculation unit 508 or the data adder is an example of a calculator.

The above-described embodiments and variations are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits. A processing circuit includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image forming apparatus comprising:
   a rotating body to form an image;
   a sensor to detect a home position of the rotating body; and
   a processor configured to
      acquire image density data of the image formed by the rotating body in odd-numbered rotation and even-numbered rotation of the rotating body separately based on a rotation home position signal output by the sensor,
      extract an image density fluctuation caused by a rotation of the rotating body based on the image density data, and
      correct an image forming condition based on the image density fluctuation, wherein , in a first rotation and a second rotation of the rotating body determined by the home position, when a number of the image density data acquired by the processor in the first rotation is less than a predetermined number, the processor continues to acquire the image density data in the second rotation as the image density data in the first rotation.

2. The image forming apparatus according to claim 1, wherein the processor comprises:
   a first data processor for even-numbered rotation to calculate the image density fluctuation in the even-numbered rotation based on the image density data in even-numbered rotation; and
   a second data processor for odd-numbered rotation to calculate the image density fluctuation in the odd-numbered rotation based on the image density data in odd-numbered rotation.

3. The image forming apparatus according to claim 2,
wherein the first data processor for even-numbered rotation calculates an average in each even-numbered rotation by sequentially adding the image density data in one memory address, and
the second data processor for odd-numbered rotation calculates an average in each odd-numbered rotation by sequentially adding the image density data in one memory address.

4. The image forming apparatus according to claim 1,
wherein, in a first rotation and a second rotation of the rotating body determined by the home position, when a number of the image density data acquired by the processor in the first rotation is more than the predetermined number, the processor acquires the predetermined number of the image density data in the first rotation and does not acquire the image density data in the second rotation as the image density data in the first rotation.

5. The image forming apparatus according to claim 1,
wherein, in a first rotation and a second rotation of the rotating body determined by the home position, the processor generates an interrupt signal to read the image density data each time a number of the image density data acquired in the first rotation reaches a read level and, after start of the second rotation, when sum of a number of the image density data acquired after the start of the second rotation and a number of the image density data acquired in the first rotation after last generation of the interrupt signal in the first rotation reaches the read level, the processor generates the interrupt signal to read the image density data.

6. The image forming apparatus according to claim 1, further comprising a memory,
wherein the processor stores in the memory data generated in an intermediate stage of a process of calculating the image density fluctuation caused by the rotation of the rotating body based on the image density data, and
the data stored in the memory is accessible from an external device.

7. An image forming method comprising:
detecting a home position of a rotating body that forms an image;
acquiring image density data of the image formed by the rotating body in even-numbered rotation and odd-numbered rotation separately while counting a number of rotations of the rotating body based on the home position detected;
calculating an image density fluctuation of the image formed by the rotating body based on the image density data; and
correcting an image forming condition based on the image density fluctuation,
wherein , in a first rotation and a second rotation of the rotating body determined by the home position, when a number of the image density data acquired in the first rotation is less than a predetermined number, the method further comprises continuing to acquire the image density data in the second rotation as the image density data in the first rotation.

* * * * *